(12) United States Patent
Storm et al.

(10) Patent No.: US 9,902,417 B2
(45) Date of Patent: Feb. 27, 2018

(54) STROLLER

(71) Applicant: DOREL JUVENILE GROUP, INC., Foxboro, MA (US)

(72) Inventors: Gerjan Storm, Eindhoven (NL); John Gert Til Van Dijk, Helmond (NL); Imre Peter Jacobs, Rossum (NL); Robert Sjang Josine Van Dijk, Eindhoven (NL)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/900,760

(22) PCT Filed: Jul. 1, 2014

(86) PCT No.: PCT/EP2014/063950
§ 371 (c)(1),
(2) Date: Dec. 22, 2015

(87) PCT Pub. No.: WO2015/000893
PCT Pub. Date: Jan. 8, 2015

(65) Prior Publication Data
US 2016/0144879 A1 May 26, 2016

(30) Foreign Application Priority Data

Jul. 4, 2013 (NL) ...................................... 2011101
Mar. 31, 2014 (NL) ...................................... 2012530

(51) Int. Cl.
*B62B 7/08* (2006.01)
*B62B 7/04* (2006.01)
(Continued)

(52) U.S. Cl.
CPC .............. *B62B 7/083* (2013.01); *B62B 7/044* (2013.01); *B62B 7/062* (2013.01); *B62B 7/068* (2013.01);
(Continued)

(58) Field of Classification Search
CPC .... B62B 7/00; B62B 7/04; B62B 7/06; B62B 7/064; B62B 7/068; B62B 7/002; B62B 7/004; B62B 7/006; B62B 7/10
See application file for complete search history.

(56) References Cited

U.S. PATENT DOCUMENTS 5,558,357 A * 9/1996 Wang ........................ B62B 7/08
 280/647
6,312,005 B1 11/2001 Lin
(Continued)

FOREIGN PATENT DOCUMENTS

CN 2494279 Y 6/2002
CN 2678996 Y 2/2005
(Continued)

OTHER PUBLICATIONS

Letter in connection with PCT/EP2014/063950 forwarding the International Search Report and Written Opinion.
(Continued)

*Primary Examiner* — James A Shriver, II
*Assistant Examiner* — Vaughn Coolman
(74) *Attorney, Agent, or Firm* — Barnes & Thornburg LLP

(57) ABSTRACT

A foldable stroller (1, 41) is provided with at least one pushrod (2, 3) being pivotable about a first pivot axis (9, 10). The folding mechanism is further provided with a number of rods, comprising a first rod (19, 20) being pivotable about a second pivot axis (17, 18). The first rod and the pushrod are provided with cooperating connecting elements (52, 56)
(Continued)

being connectable to each other by pivoting the pushrod about the first pivot axis to an erect position of the pushrod, in which position the connecting elements are lockable to each other by locking means (57). When the locking means are unlocked and the connecting elements are still connected to each other, the connecting means prevent the first rod to pivot about the second pivot axis. After unlocking the locking means as well as after disconnecting the connecting elements by pivoting the pushrod about the first pivot axis towards a collapsed position of the pushrod, the first rod is pivotable about the second axis to achieve the collapsed position of the stroller.

22 Claims, 20 Drawing Sheets

(51) Int. Cl.
  *B62B 7/06* (2006.01)
  *F16C 11/10* (2006.01)
(52) U.S. Cl.
  CPC .............. *B62B 7/086* (2013.01); *F16C 11/10* (2013.01); *B62B 2205/20* (2013.01); *B62B 2205/22* (2013.01)

(56) References Cited

U.S. PATENT DOCUMENTS

| | | | | |
|---|---|---|---|---|
| D583,719 S * | 12/2008 | Siewertsen | .................. | D12/129 |
| 7,568,721 B2 * | 8/2009 | Huang | .................... | B62B 7/083 |
| | | | | 280/47.38 |
| 7,571,926 B2 * | 8/2009 | Huang | .................... | B62B 7/068 |
| | | | | 280/642 |
| 7,607,725 B2 * | 10/2009 | Dickie | .................... | B62B 7/10 |
| | | | | 280/250.1 |
| 8,403,355 B2 * | 3/2013 | Liao | .................... | B62B 3/02 |
| | | | | 280/40 |
| 8,585,076 B2 * | 11/2013 | Thorne | .................... | B62B 7/068 |
| | | | | 280/650 |
| 9,004,505 B1 * | 4/2015 | Wu | .................... | B62B 3/022 |
| | | | | 280/38 |
| 2009/0008907 A1 * | 1/2009 | Huang | .................... | B62B 7/083 |
| | | | | 280/642 |
| 2009/0014985 A1 * | 1/2009 | Huang | .................... | B62B 7/068 |
| | | | | 280/647 |
| 2011/0181026 A1 * | 7/2011 | Yeh | .................... | B62B 7/062 |
| | | | | 280/650 |
| 2011/0215553 A1 * | 9/2011 | Thorne | .................... | B62B 7/068 |
| | | | | 280/650 |
| 2013/0015304 A1 * | 1/2013 | Chen | .................... | B62B 7/06 |
| | | | | 248/205.1 |
| 2014/0339038 A1 * | 11/2014 | Welker | .................... | B62B 3/02 |
| | | | | 190/18 A |
| 2015/0175185 A1 * | 6/2015 | Thorpe | .................... | B62B 5/0016 |
| | | | | 280/491.1 |

FOREIGN PATENT DOCUMENTS

| | | | |
|---|---|---|---|
| CN | 2678998 Y | 2/2005 | |
| CN | 2693593 Y | 4/2005 | |
| CN | 2868804 Y | 2/2007 | |
| CN | 201026908 Y | 2/2008 | |
| CN | 100453376 C | 1/2009 | |
| CN | 201258002 Y | 6/2009 | |
| CN | 101678851 A | 3/2010 | |
| CN | 201784644 U | 4/2011 | |
| CN | 201784663 U | 4/2011 | |
| CN | 201784671 U | 4/2011 | |
| CN | 201999034 U | 10/2011 | |
| CN | 202080319 U | 12/2011 | |
| CN | 102078106 B | 2/2013 | |
| CN | 102975758 A | 3/2013 | |
| CN | 202966386 U | 6/2013 | |
| DE | 29706250 U1 | 5/1997 | |
| DE | 29801117 U1 | 3/1998 | |
| DE | 20011055 U1 | 10/2000 | |
| EP | 1078840 A2 | 2/2001 | |
| EP | 1366968 A1 | 12/2003 | |
| EP | 1466810 A1 | 10/2004 | |
| EP | 2014536 A1 | 1/2009 | |
| GB | 2351131 B | 12/2003 | |
| GB | 2495722 A | 4/2013 | |
| WO | 2008103616 A1 | 8/2008 | |

OTHER PUBLICATIONS

International Search Report and Written Opinion completed on Oct. 8, 2014 and issued in connection with PCT/EP2014/063950.
Search Report and Written Opinion completed on Jul. 1, 2014 issued in connection with NL 2012530.
Search Report and Written Opinion completed on Apr. 1, 2014 and issued in connection with NL 2011101.

* cited by examiner

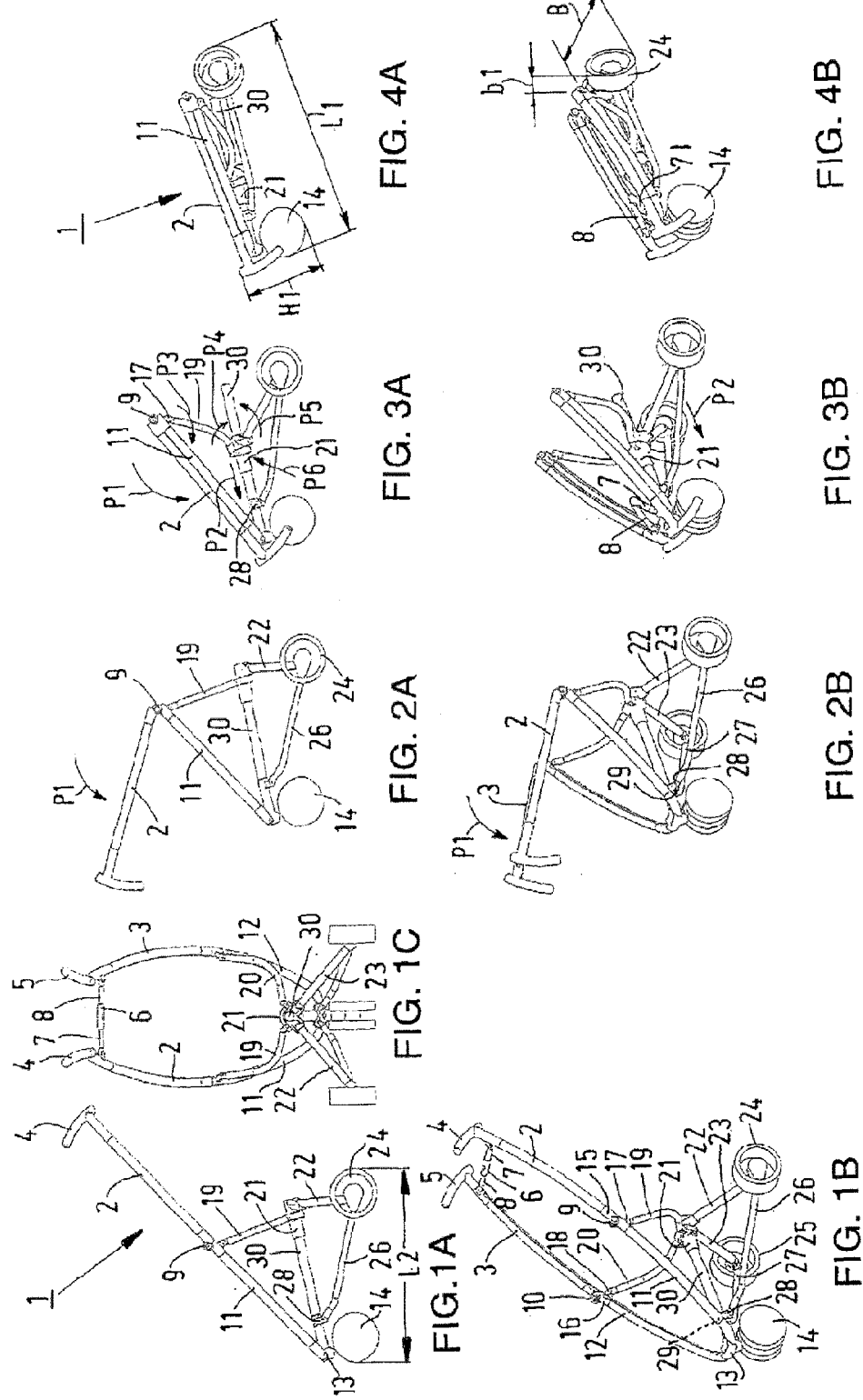

STROLLER

CROSS REFERENCE TO RELATED APPLICATIONS

This application is a U.S. nationalization under 35 U.S.C. § 371 of International Application No. PCT/EP2014/063950, filed Jul. 1, 2014, which claims priority to Netherlands Patent Application No. 2011101 filed 4 Jul. 2013 and Netherlands Patent Application No. 2012530 filed 31 Mar. 2014.

The invention relates to a stroller being foldable from an erect position to a collapsed position, and vice versa, which stroller comprising at least a collapsible folding mechanism, provided with at least one push rod fitted with a handle, which push rod is pivotable about a first pivot axis of the folding mechanism, which folding mechanism is further provided with a number of rods, wherein a first rod of said number of rods is pivotable about a second pivot axis of the folding mechanism.

Such a stroller, which is known from EP1466810A1 of applicant, is being folded by collapsing the folding mechanism wherein the push rod is being pivoted about the first pivot axis and the first rod is being pivoted about the second pivot axis. In the erect position undesirable collapsing of the folding mechanism and folding of the stroller is prevented by several locking means.

EP1466810A1 does not disclose detailed information about the locking means.

The object of the invention is to provide a stroller wherein pivoting of the push rod about the first pivot axis as well as pivoting of the first rod about the second pivot axis in the erect position of the stroller are easily being prevented, whilst allowing the stroller to collapse is relatively easy as well.

This object is accomplished with the stroller according to the invention in that the first rod and the pushrod are provided with cooperating connecting elements, which connecting elements being connectable to each other by pivoting the pushrod about the first pivot axis to an erect position of the push rod, wherein in the erect position of the push rod, the connecting elements are lockable to each other by locking means, wherein when the locking means are unlocked and the connecting elements are still connected to each other, the connecting means prevent the first rod to pivot about the second pivot axis, whilst after unlocking the locking means as well as after disconnecting the connecting elements by pivoting the pushrod about the first pivot axis towards a collapsed position of the push rod, the first rod is pivotable about the second pivot axis to allow the folding mechanism to collapse into the collapsed position of the stroller.

In the erect position, the connecting elements of the push rod and first rod are connected to each other. Undesired disconnecting of the connecting elements is being prevented by the locking means. When the locking means are unlocked and the connecting elements are still connected to each other, the connecting means prevent the first rod to be able to pivot about the second pivot axis. This is an additional safety feature, so that even if the unlocking means are unlocked the first rod can not pivot and the folding mechanism can not collapse. To disconnect the connecting elements, the push rod is being pivoted about the first pivot axis, due to which the connecting element of the push rod is being moved away from the connecting element of the first rod. As soon as the connecting elements are disconnected, the first rod can be pivoted about the second pivot axis and the folding mechanism can be collapsed.

If a user wants to fully collapse the stroller, he only needs to unlock the locking means, after which by pivoting the push rod to the collapsed position of the push rod, the connecting means are automatically being disconnected, so that the first rod can be pivoted about the second axis and the folding mechanism can further be collapsed. If a user wants to erect the stroller, he unfolds the folding mechanism, whereby at the end of the unfolding process the push rod is being pivoted from the collapsed position of the push rod to the erect position of the push rod, wherein the connecting means of the push rod and first rod are being connected to each other. Once the connecting means are being coupled, the locking means are being activated, to prevent undesired uncoupling of the connecting means.

An embodiment of the stroller according to the invention is characterized in that the first and second pivot axes are provided near an end of a second rod extending substantially parallel to the push rod in the erect position of the stroller.

The second rod form part of the folding mechanism as well. Such second rod may be connected at a side remote from the pivot axes, to a wheel, for example a front wheel of the stroller. By having the first and second pivot axes on the same component, like the second rod, the distance between the first and second pivot axes is fixed, ensuring that the relative positions of the connecting elements of the push rod and first rod are well defined. The first and second axis may extend parallel or may be inclined with respect to each other.

Another embodiment of the stroller according to the invention is characterized in that on both sides of the stroller, such a push rod fitted with said handle, such a first rod as well as such a second rod, extending substantially parallel to the push rod in the erect position of the stroller are located.

On both sides the push rod and first rod are provided with cooperating connecting elements, wherein in the erect position of the stroller, pivoting of the push rods about the first pivot axes is being prevented by the locking means. In this manner a stable folding mechanism is being obtained.

It is possible to unlock the locking means on each side indepindently from each other so that on each side the connecting means can indepindently being unlocked. It is however also possible that the connecting means on both sides can simultaneously being unlocked, rendering the operation of the stroller more easily.

Another embodiment of the stroller according to the invention is characterized in that a first of said connecting elements comprises a protrusion, whilst a second of said connecting elements comprises a hook, which is positioned over the protrusion, when the connecting elements are connected to each other.

Such a protrusion-hook combination can easily be provided on the stroller. If the protrusion is located in the hook a good connection between the connecting elements is obtained.

Another embodiment of the stroller according to the invention is characterized in that the locking means comprises a pen (pin) being slidably located in the push rod, which pen (pin) is movable against spring force from a first locked position wherein the pen (pin) is located in a passage of the first rod, to a second unlocked position wherein the pen (pin) is removed from the passage to allow the push rod to pivot about the first pivot axis.

Such a locking means is relatively simple to manufacture and to operate.

Another embodiment of the stroller according to the invention is characterized in that the locking means comprises unlocking means, which unlocking means comprises a cable connected with a first end to the pen (pin) and with a second end to a movable operating element located on the push rod, preferably on the handle of the push rod.

Such a cable, for example a bowden cable, makes it possible to connect the pen (pin) to an operating element located at any desired location on the stroller. In case that the operating element is located on the handle, a user can simply move the operating element to unlock the locking means after which the user can maintain its hands on the handle to pivot the push rod provided with the handle about the first pivot axis.

Another embodiment of the stroller according to the invention is characterized in that stroller comprises a support, at least one front wheel connected to the support and at least one rear wheel, which wheels are interconnected by means of the folding mechanism, wherein the folding mechanism comprises a cross shaped linkage system having at least one central joint as well as the first rod and additional rods extending from said central joint, wherein first ends of the first and the additional rods are pivotally connected to the central joint, whilst a second end of one of the additional rods (remote from the central joint is connected to said rear wheel and a second end of the first rod remote from the central joint is pivotable about the second pivot axis of the folding mechanism, which central joint being movable with respect to the support over an axis extending between the central joint and the support during erection and collapsion of the stroller.

Such a cross shaped linkage system, which is known from EP1466810A1 of applicant, renders it possible to obtain a compact stable foldable stroller, with a relatively low numbers of rods, which can be folded in three dimensions. The stroller can easily be folded from the erect position to the collapsed position, and vice versa, by moving the central joint and the support connected to the front wheel relative to each other over said axis, as it were. Said axis may be a physical axis, in the form of a rod, or an imaginary axis.

The folding mechanism may collapse by moving the central joint towards the support and be erected by moving the central joint away from the support. It is also possible to collapse the folding mechanism by moving the central joint away from the support and to erect it by moving the central joint towards from the support.

Another embodiment of the stroller according to the invention is characterized in that the folding mechanism furthermore comprises a rod connected to the support, which rod is slidably connected to the central joint with an end remote from the support, wherein said axis extends through said rod.

The slidably interconnected rod and central joint ensure a strong connection between a front side and the rear side of the stroller.

Another embodiment of the stroller according to the invention is characterized in that at an end remote of the support a disc-shaped stop element extending perpindicular to the central rod is connected to the central rod, wherein the pivot axes of the rods are located on a side of the central joint directed towards the disc-shaped stop element, whereby in the erect position, at least the first ends of the rods abut against the disc-shaped stop element.

As the pivot axes of the rods are located on a side of the central joint directed towards the disc-shaped stop element, the rods can pivot with respect to the central joint in a direction towards the disc-shaped stop element. However as soon as the central joint has been moved towards the disc-shaped stop element and is in a position wherein at least the first ends of the rods abut against the disc-shaped stop element, pivoting of the rods with respect to the central joint in the direction towards the disc-shaped stop element is being prevented by the disc-shaped stop element. Furthermore by the disc-shaped stop element and the rods being in abutment with the disc-shaped stop element, also further movement of the central joint along the central rod in the direction towards the disc-shaped stop element is being prevented.

Another embodiment of the stroller according to the invention is characterized in that in the erect position at least the first ends of the rods abut against the central joint.

The rods can pivot with respect to the central joint in a direction away from the disc-shaped stop element, however as soon as the central joint has been moved towards the disc-shaped stop element and is in a position wherein at least the first ends of the rods abut against the disc-shaped stop element, the at least first ends of the rods also abut against the central joint so that pivoting of the rods with respect to the central joint is being prevented by the central joint and the disc-shaped stop element.

Another embodiment of the stroller according to the invention is characterized in that in the erect position the central joint abuts against the disc-shaped stop element.

In this manner further movement of the central joint along the central rod in the direction towards the disc-shaped stop element is being prevented.

Another embodiment of the stroller according to the invention is characterized in that the central joint and the disc-shaped stop element are provided with at least one cooperating set comprising a groove and a notch, the groove being provided on the central joint, whilst the notch being provided on the disc-shaped stop element or vice versa, whereby in the erect position, the notch is located in the groove to prevent rotation of the central joint about the central rod.

As the notch is located in the groove, the central joint and thus the rods connected thereto are prevented from rotating with respect to the central rod and a very rigid erected cross-shaped linkage system is obtained.

Another embodiment of the stroller according to the invention is characterized in that with respect to a virtual plane extending through pivot axes at the second ends of the rods, the pivot axes of the first ends of the rods are located on one side of said virtual plane in the collapsed position and on the other side of said virtual plane in the erect position.

By moving the pivot axes of the first ends of the rods from one side to the other side of the virtual plane or vice versa, there will a position wherein the pivot axes are located in the virtual plane, which position forms a so called dead centre. To move the pivot axes of the first ends of the rods through the dead centre will require forces, so that without applying the required forces, the pivot axes of the first ends of the rods will automatically remain at the respective side of the virtual plane in the collapsed position and in the erect position.

Another embodiment of the stroller according to the invention is characterized in that the stroller comprises two of said at least one rear wheels and two of said at least one push rods fitted with a handle, wherein the cross shaped linkage system comprises at least four rods, wherein second ends of the four rods are located near said rear wheel and near said push rod fitted with the handle respectively.

In this manner a relatively simple and symmetrical construction of the cross-shaped linkage system is realized.

Another embodiment of the stroller according to the invention is characterized in that second ends of two rods forming part of the cross-shaped linkage system are each pivotably connected to the push rod fitted with the handle as well as to a rod connected to said at least one front wheel.

In this manner a compact stroller with a relatively limited number of pivot axes is obtained.

Another embodiment of the stroller according to the invention is characterized in that the central joint comprises a bushing in which a rod connected to the support is slidably accommodated.

In this way the rod connected to the front wheel can be supported in the bushing in a simple manner, whilst the rods extending from said central joint can easily be pivotable connected to the bushing in a simple manner.

Another embodiment of the stroller according to the invention is characterized in that said axis is an imaginary axis which extends through the support and through the central joint.

Together with the support, the ends of the rods remote from the central joint form an imaginary pyramid, with the support forming the top and the surface defined by the ends of the rods remote from the central joint forming the base. The central joint of the cross-shaped linkage system lies on a line which extends through the support and the centre of said surface. By moving the central joint with respect to the support over the imaginary axis an easily collapsible folding mechanism is obtained. Upon collapsing, the ends of the rods are moved together in an even manner.

The invention also relates to a stroller being foldable from an erect position to a collapsed position, and vice versa, which stroller comprising at least one front wheel and at least one rear wheel, which wheels are interconnected by means of a collapsible folding mechanism, which stroller furthermore comprises at least one push rod fitted with a handle, which is connected to the folding mechanism, the folding mechanism comprises at least a cross shaped linkage system having a central joint and a central rod connected via a support to said at least one front wheel, which cross shaped linkage system also comprises a number of rods each extending from said central joint and with a first end pivotally connected about a pivot axis to the central joint, wherein second ends of rods remote from said central joint are located near said rear wheel and near said push rod fitted with the handle, respectively, which central joint being slidable over the central rod away from and to the support during the erection and collapsion of the stroller, wherein at an end remote of the support a disc-shaped stop element extending perpindicular to the central rod is connected to the central rod, wherein the pivot axes of the rods are located on a side of the central joint directed towards the disc-shaped stop element, whereby in the erect position, at least the first ends of the rods abut against the disc-shaped stop element.

As the pivot axes of the rods are located on a side of the central joint directed towards the disc-shaped stop element, the rods can pivot with respect to the central joint in a direction towards the disc-shaped stop element. However as soon as the central joint has been moved towards the disc-shaped stop element and is in a position wherein at least the first ends of the rods abut against the disc-shaped stop element, pivoting of the rods with respect to the central joint in the direction towards the disc-shaped stop element is being prevented by the disc-shaped stop element. Furthermore by the disc-shaped stop element and the rods being in abutment with the disc-shaped stop element, also further movement of the central joint along the central rod in the direction towards the disc-shaped stop element is being prevented.

Another embodiment of the stroller according to the invention is characterized in that in the erect position the stroller is locked by locking means located at a connection between the rod fitted with a handle and the folding mechanism.

By having a locking means located at the connection between the rod fitted with a handle and the folding mechanism, undesirable folding of the rod fitted with a handling collapsing of the folding mechanism and folding of the stroller is easily being prevented and no locking means are needed at or near the central rod or the disc-shaped stop element.

Another embodiment of the stroller according to the invention is characterized in that the central joint comprises a bushing in which the central rod is slidably accommodated.

In this way the central rod connected to the front wheel can be supported in the bushing in a simple manner, whilst the rods extending from said central joint can be pivotably connected to the bushing in a simple manner. The rods of the cross-shaped linkage system may be rigidly as well as pivotally connected to each other. When a rigid connection between the rods of the cross-shaped linkage system is used, the stroller can be collapsed in two dimensions, whilst in the case of a pivoted connection the stroller can be collapsed in three dimensions.

The invention will be explained hereinafter with reference to the drawings, in which:

FIGS. 1A-1C are a side view, a perspective view and a rear view, respectively, of a first embodiment of a stroller according to the invention, showing the stroller in an erect position thereof;

FIGS. 2A and 2B are a side view and a perspective view of the stroller that is shown in FIGS. 1A-1C, showing the stroller in a partially collapsed position;

FIGS. 3A and 3B are a side view and a perspective view of the stroller that is shown in FIGS. 1A-1C, showing the stroller in a further stage of being collapsed;

FIGS. 4A and 4B are a side view and a perspective view of the stroller that is shown in FIGS. 1A-1C, showing the stroller in a fully collapsed position;

Figure 6:
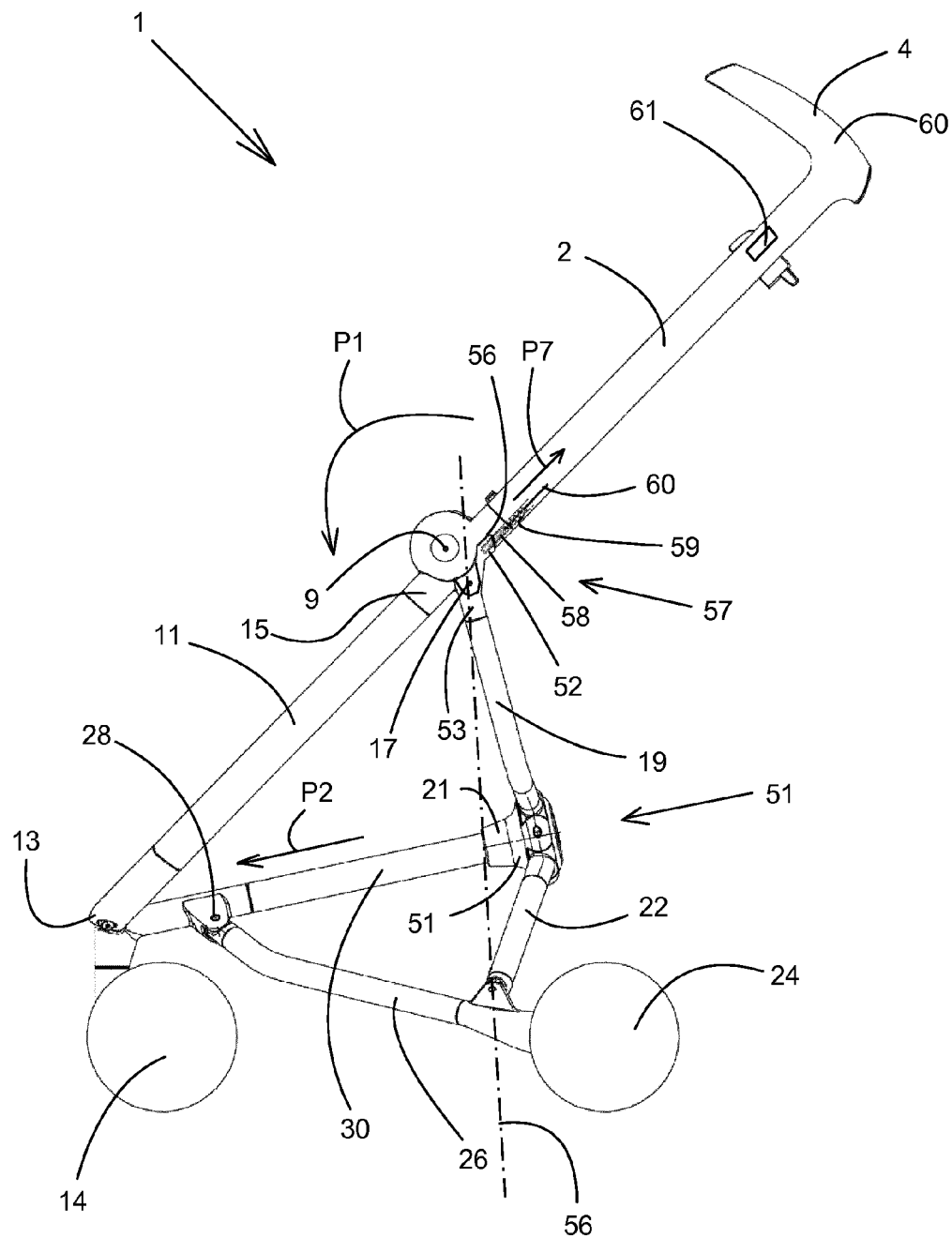
FIG. 6 shows a detailed side view of the stroller as shown in FIGS. 1A-1C, showing the stroller in an erect position thereof.
Figure 13A:
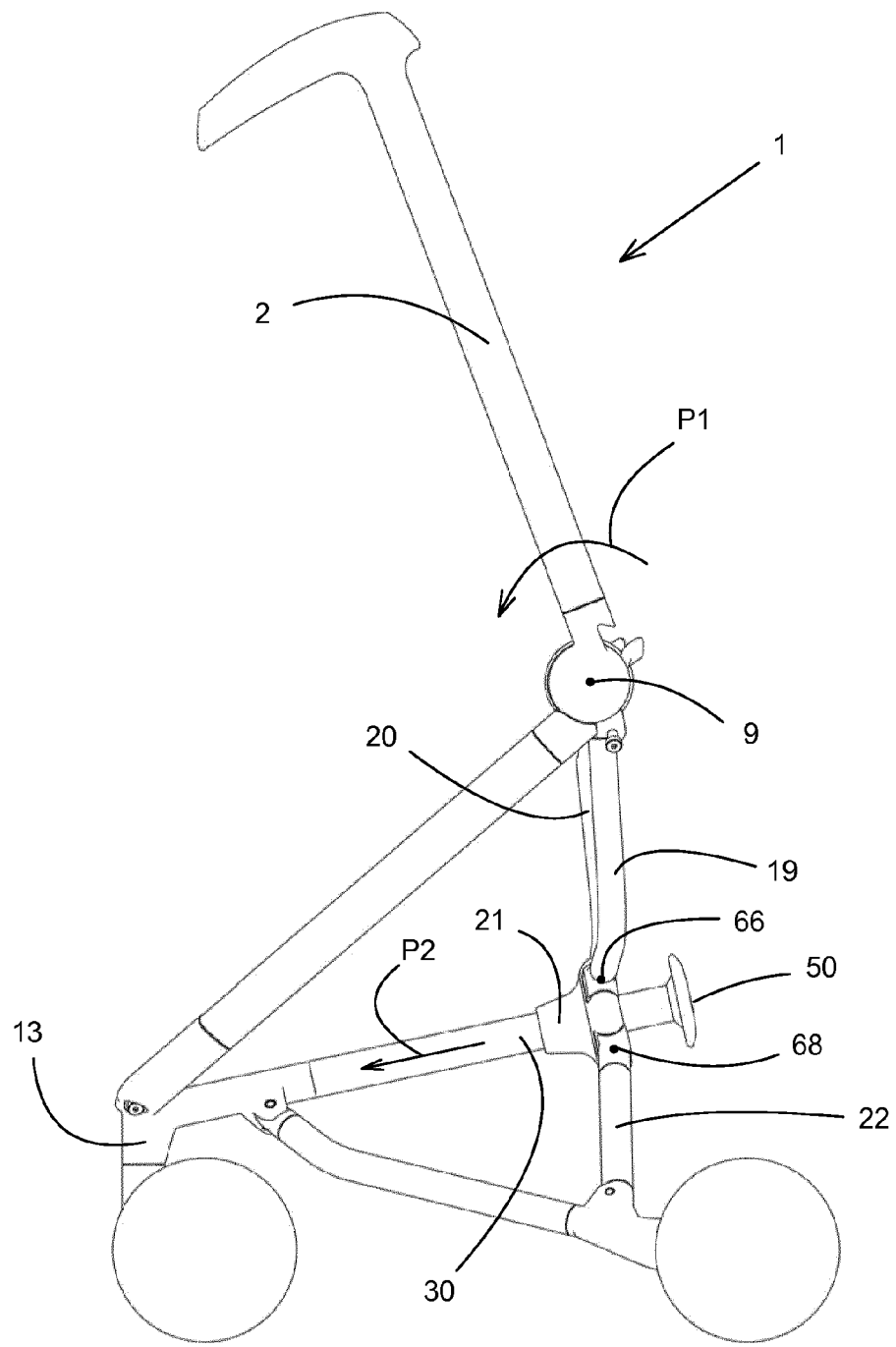
Figure 13B:
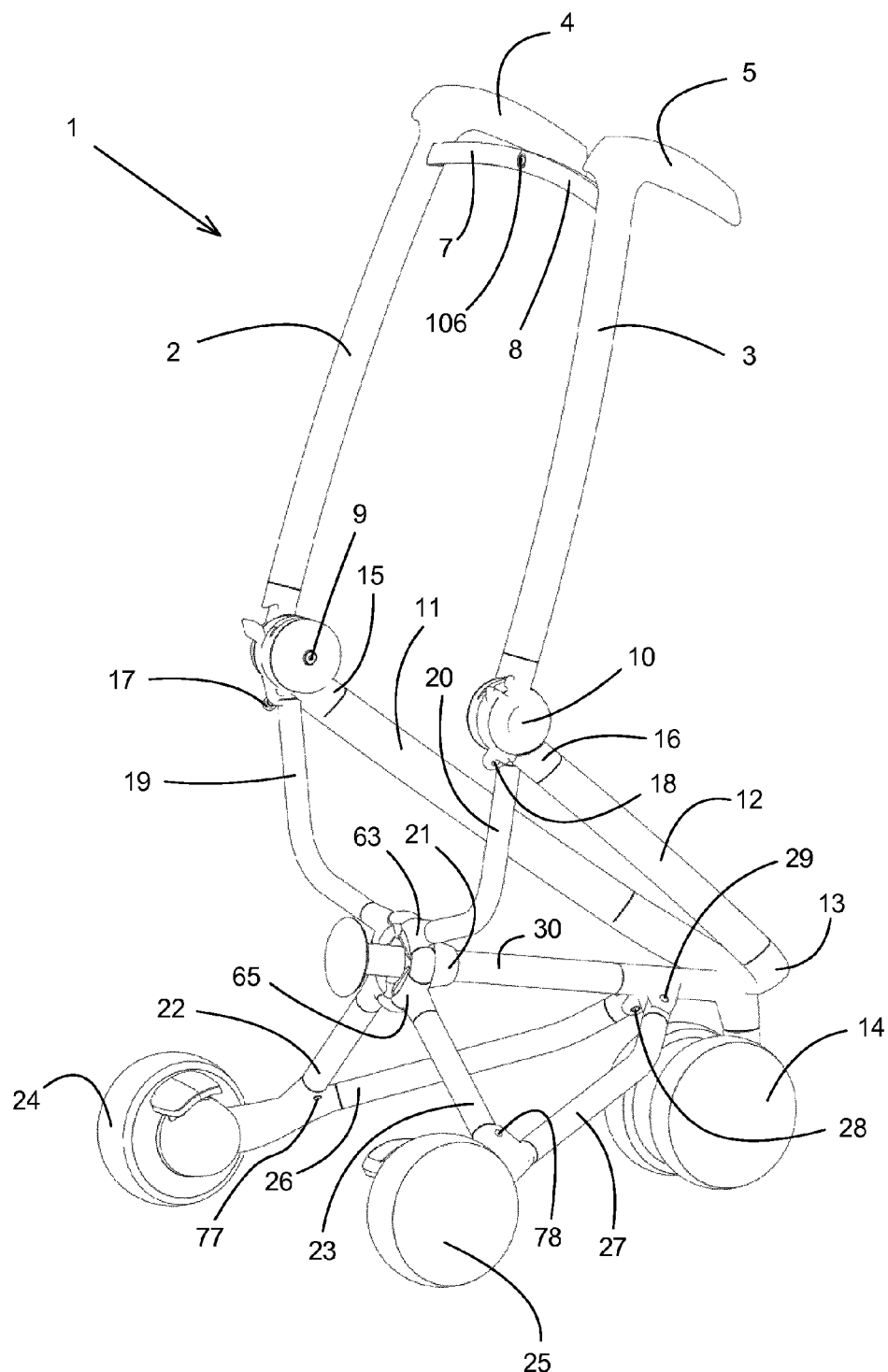
Figure 13C:
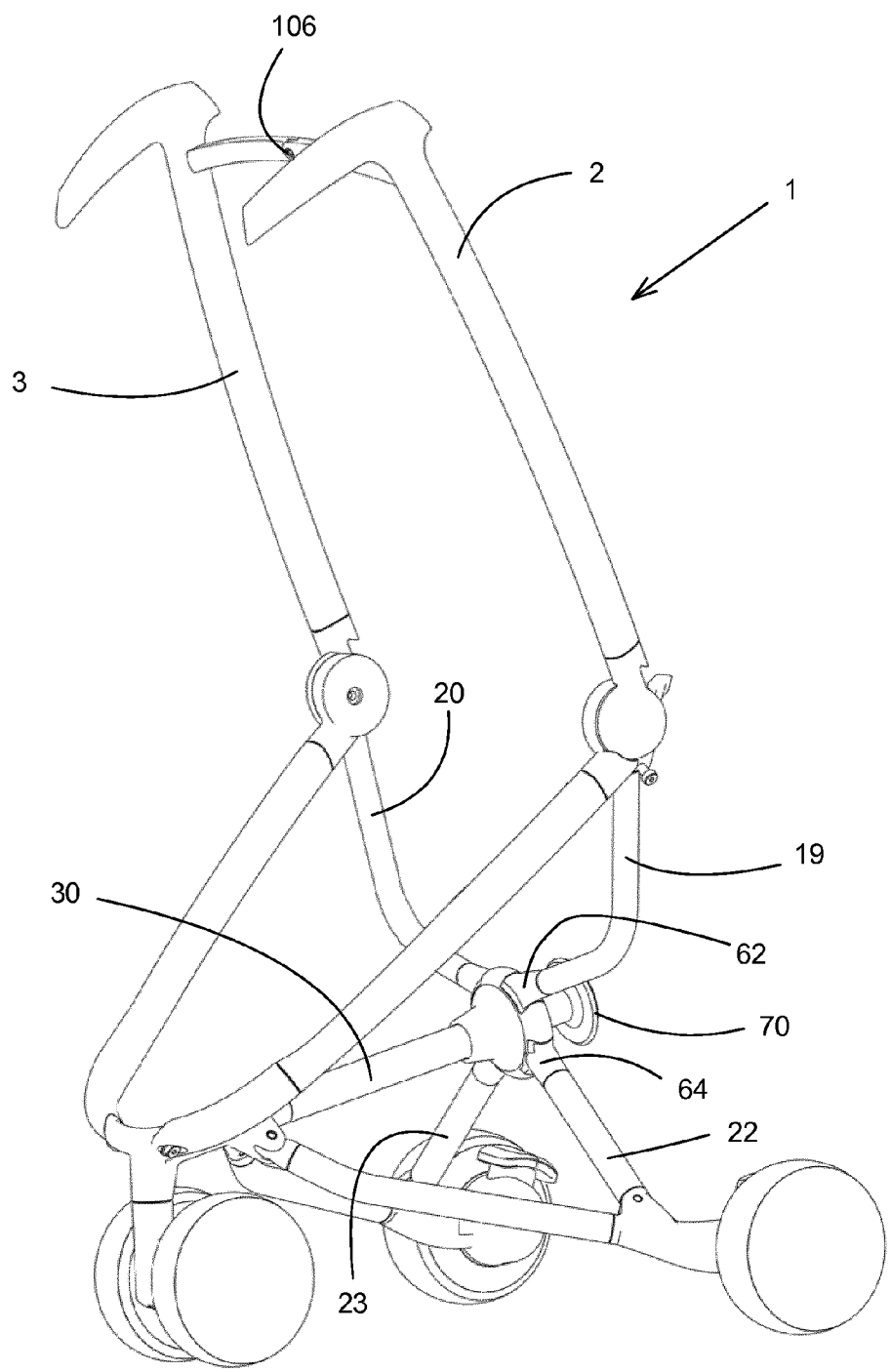
Figure 14:
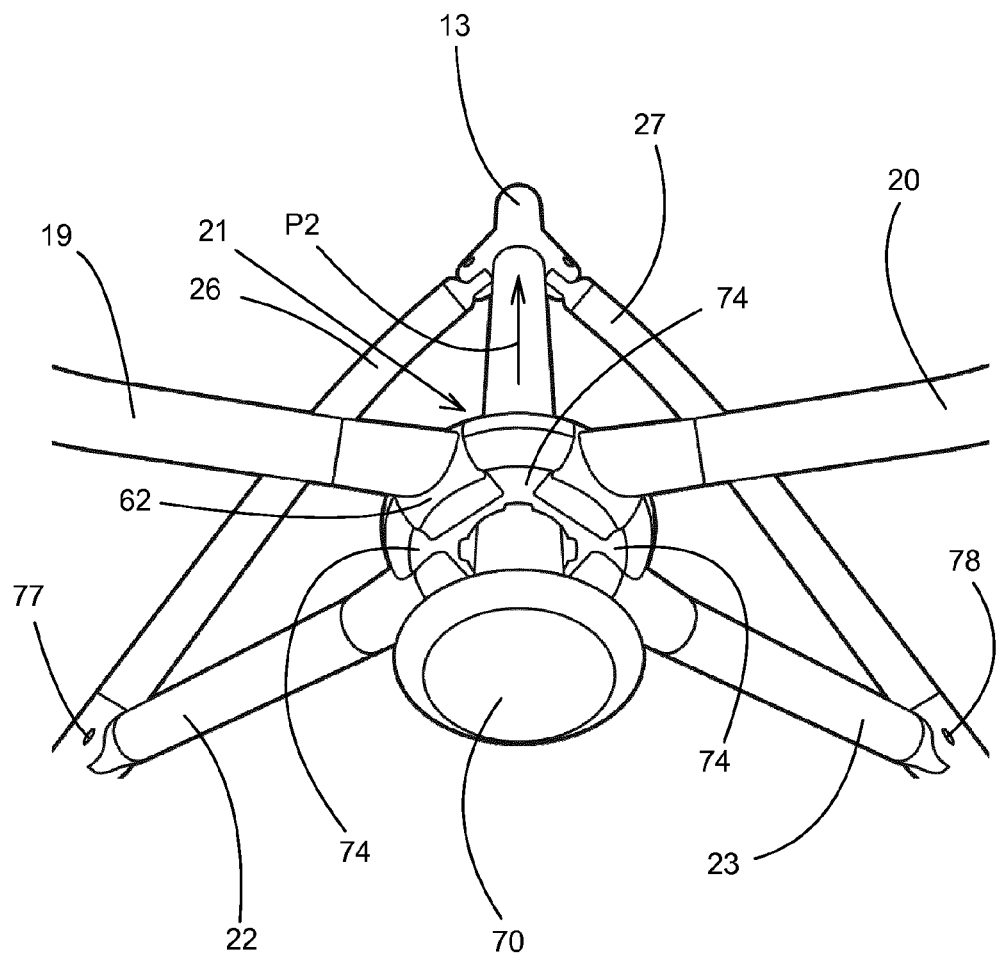
Figure 15:
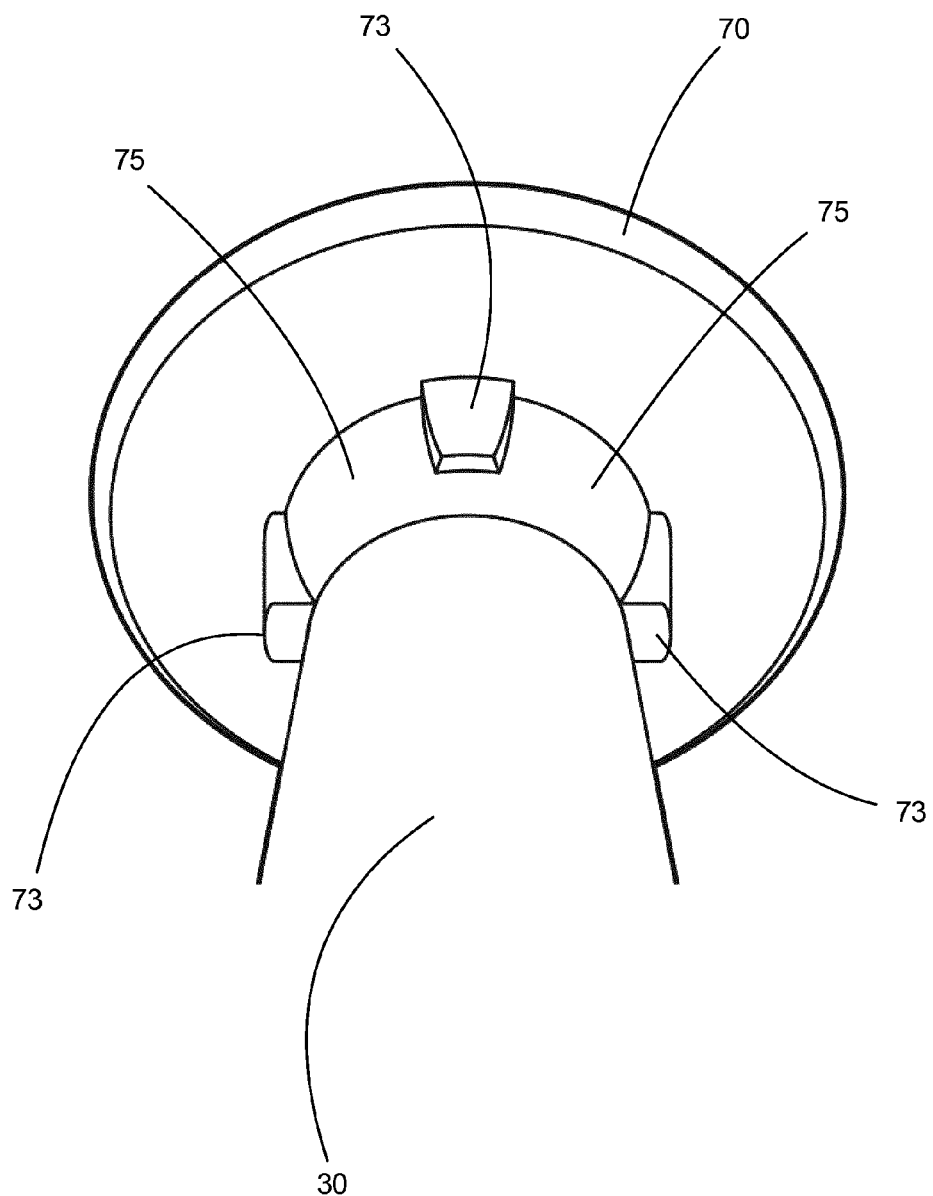
Figure 16:
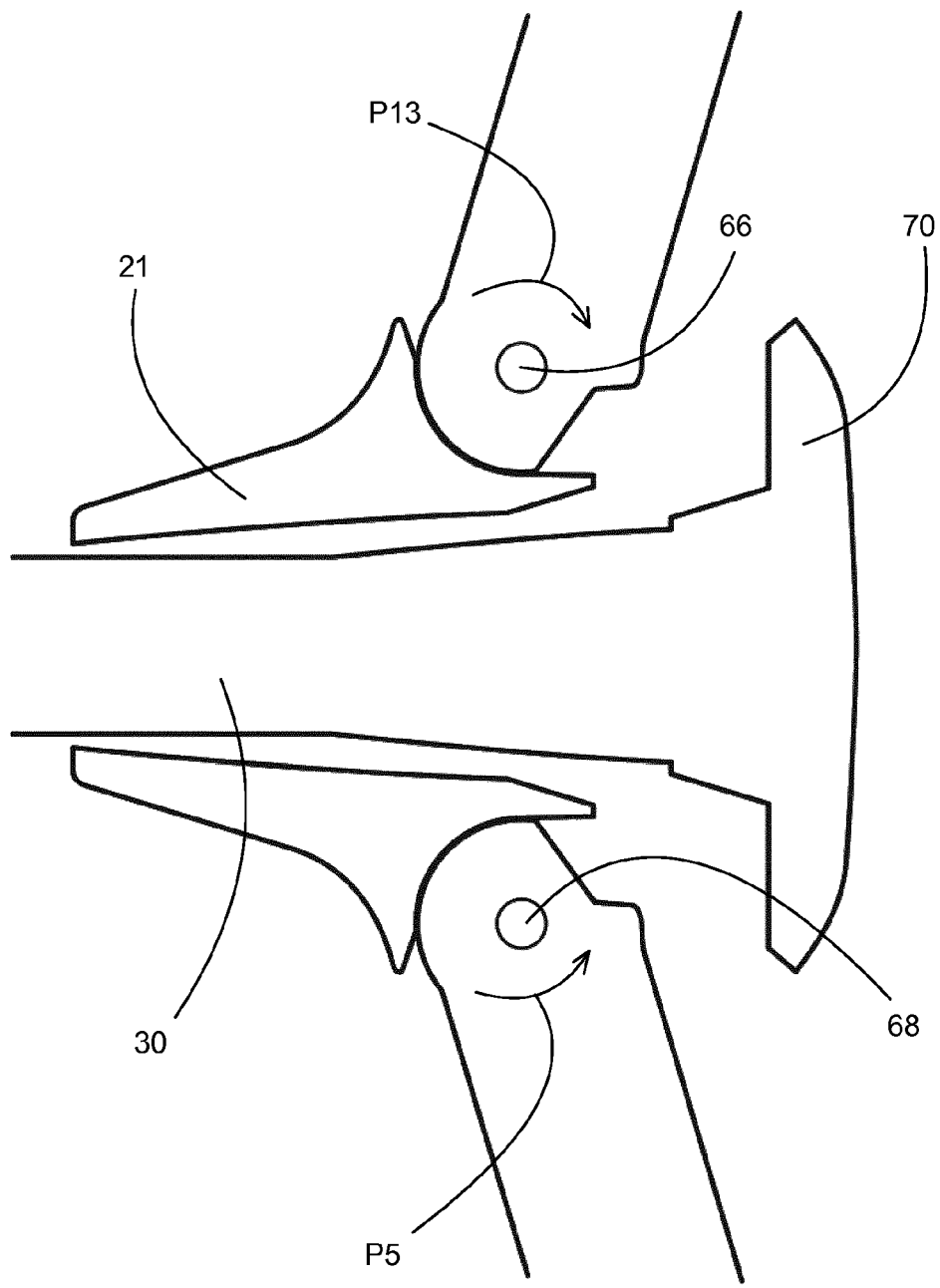
Figure 17:
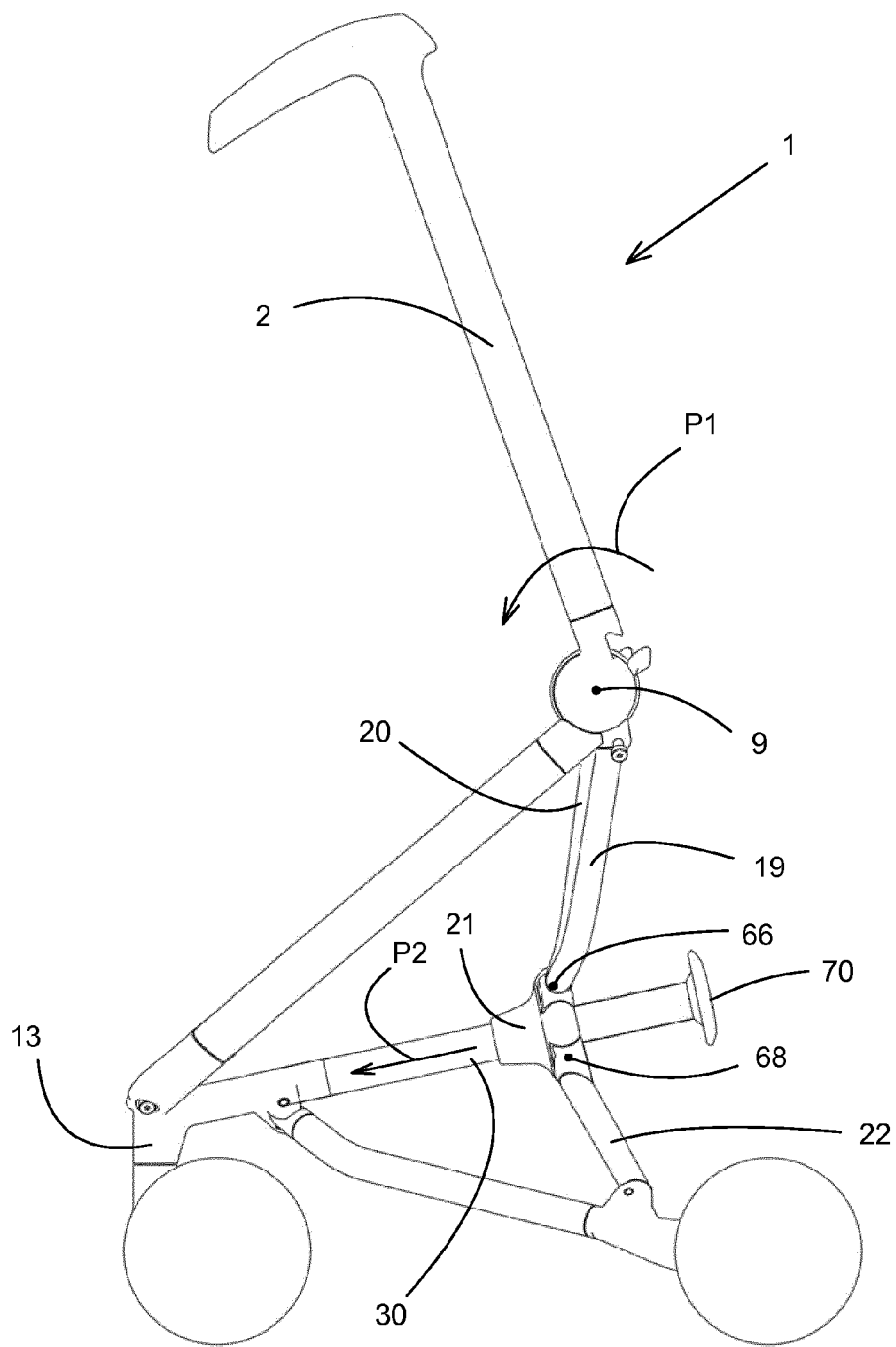
Figure 18:
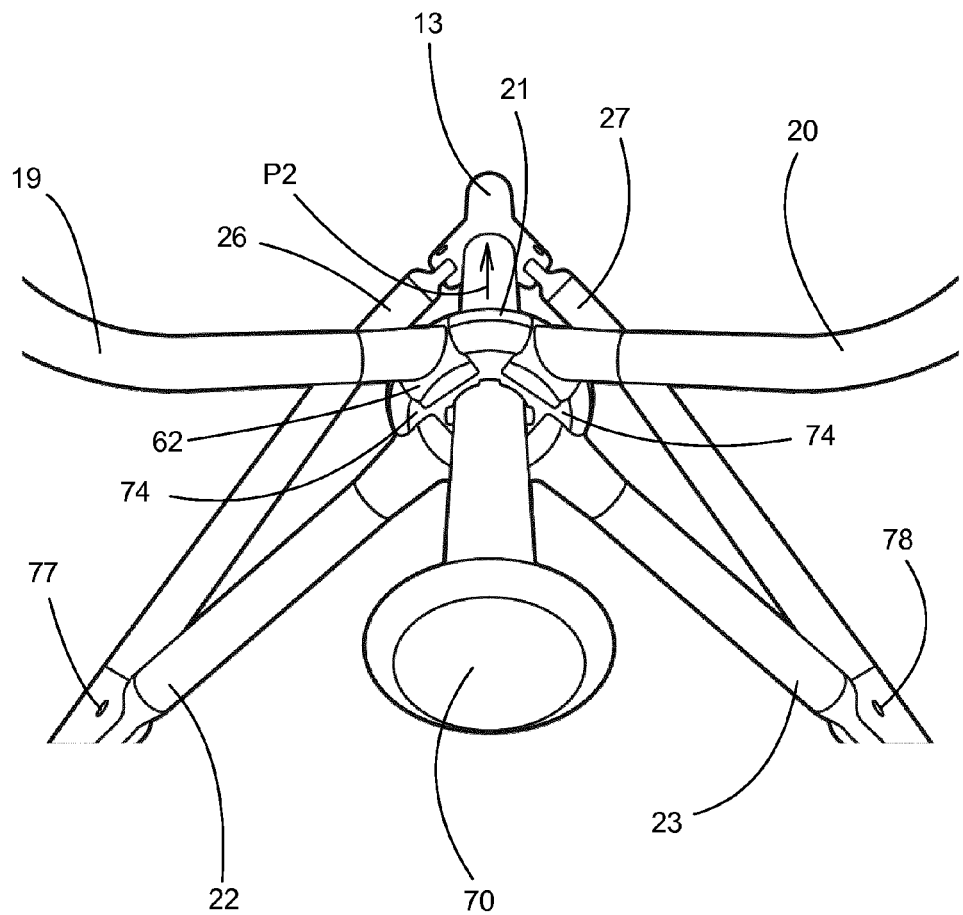

FIG. 14 shows an enlarged rear view of a part of the stroller as shown in the FIGS. 13A-13C, FIG. 15 shows an enlarged view of a central rod and a disc-shaped stop element of the stroller as shown in FIG. 6, FIG. 16 shows a cross section of the enlarged rear view of the stroller as shown in FIG. 14, FIG. 17 shows a detailed side view, showing the stroller as shown in FIG. 6 in a partly collapsed position thereof;

FIG. 18 shows an enlarged rear view of a part of the stroller as shown in FIG. 17.

Figure 19:
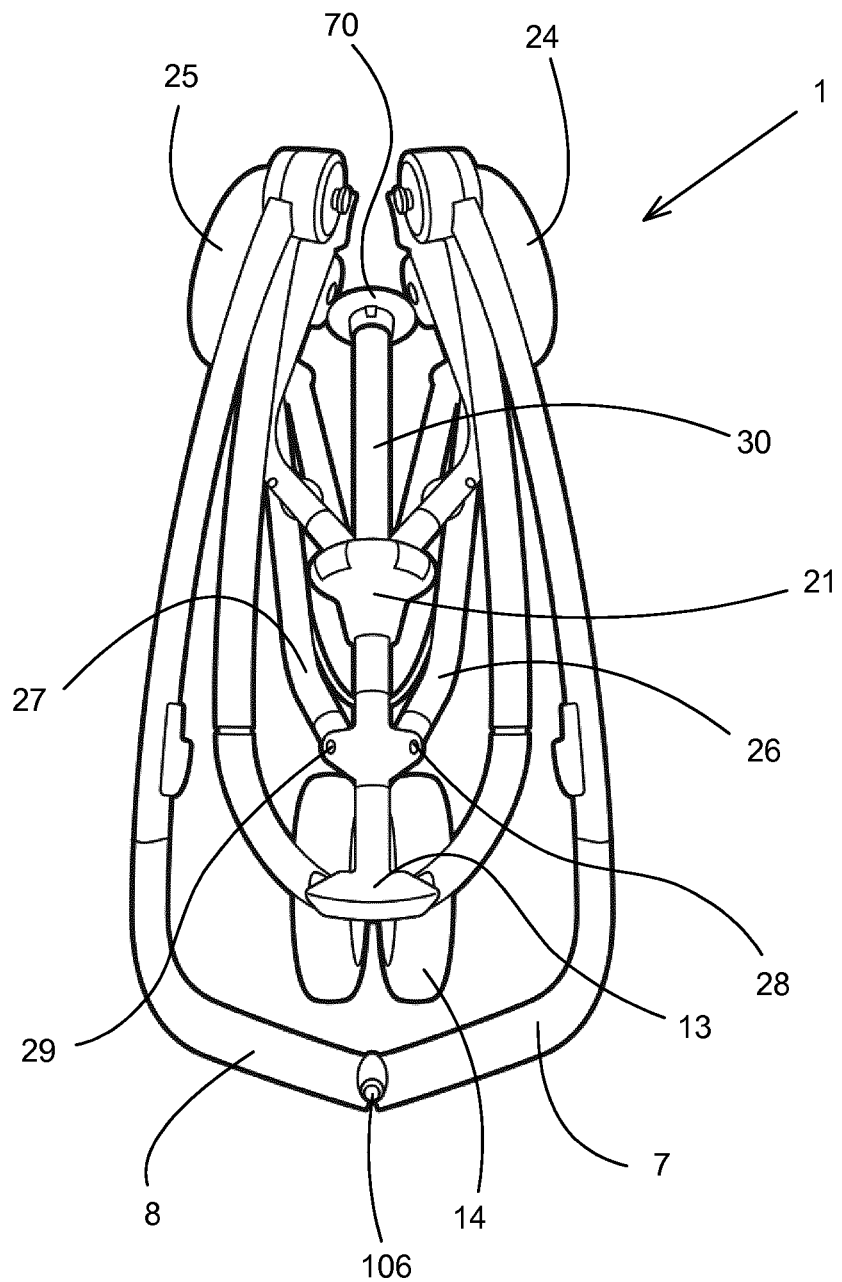

FIG. 19 shows a detailed top view of the stroller as shown in FIG. 6, showing the stroller in a collapsed position thereof.

In the figures, like parts are indicated by the same numerals.

FIGS. 1A-1C are a side view, a perspective view and a rear view of a first embodiment of a stroller 1 according to the invention. For reasons of clarity of the drawing, the stroller 1 is not provided with a seat for an infant to be transported by means of the stroller. The stroller 1 comprises two push rods 2, 3 extending parallel to each other, which are fitted with a handle 4, 5 at one end. Two pivotally interconnected rods 7, 8, which can be interlocked by means of a locking element 6, extend between the handles 4, 5. At their ends remote from the handles 4, 5, the push rods 2, 3 are pivotally connected to rods 11, 12 about first pivot axis 9, 10. At their ends remote from the push rods 2, 3, the rods 11, 12 are interconnected by means of a support 13. A front wheel 14 is pivotally connected about a vertically extending axis to the support 13. The first pivot axis 9, 10 are each provided on an end part 15, 16 of the rods 11, 12. On the end parts 15, 16 of the rods 11, 12 are furthermore provided second pivot axis 17, 18, to which ends of J-shaped rods 19, 20 are connected. The J-shaped rods 19, 20 are pivotally connected at their ends remote from the second pivot axis 17, 18 to a bushing 21 forming a central joint. Two wheel supporting rods 22, 23 are pivotally connected to the bushing 21. Each wheel supporting rod 22, 23 has a rear wheel 24, 25 mounted thereto at the end remote from the bushing 21, which rear wheels are rotatable about a horizontally extending axis. The wheel supporting rods 22, 23 are furthermore pivotally connected to intermediate rods 26, 27 at their ends remote from the bushing 21. The rear wheels 24, 25 are mounted on the intermediate rods 26, 27. The intermediate rods 26, 27 are pivotally attached to the support 13 about third pivot axes 28, 29 remote from the rear wheels 24, 25, near the front wheel 14. The support 13, which is positioned near the front wheel 14, is connected to an end of a rod 30 which is slidably accommodated in the bushing 21 with an end remote from the support 13. The J-shaped rods 19, 20 and the wheel supporting rods 22, 23 together form a cross-shaped linkage system 51. The rods 19, 20, 22, 23 of the cross-shaped linkage system are pivotally connected to the central joint comprising the bushing 21.

Only a frame of the stroller 1 is shown in FIGS. 1A-4B. A seat for an infant may be mounted in the frame by means that are known per se. This seat may be a non-folding bucket-type seat, in which case the seat must be removed from the frame prior to the stroller 1 being collapsed. This seat may also be made of a cloth or a folding bucket-type seat, for example, which is secured to the rods 2, 3, 11, 12 and which may be folded and remain attached to the frame upon collapsing of the stroller 1.

Figures 5A, 5C:
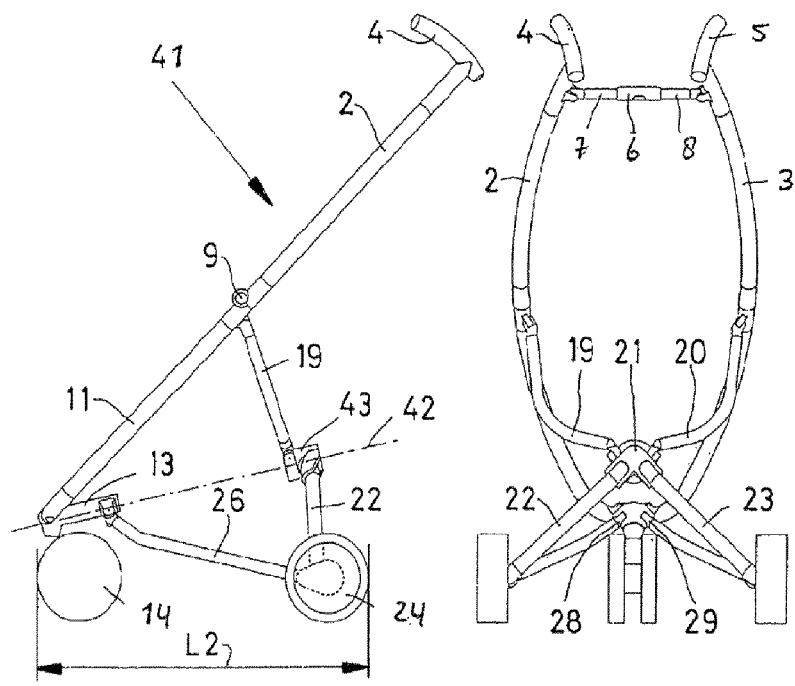
FIGS. 5A-5C are a side view, a perspective view and a rear view, respectively, of a second embodiment of the stroller according to the invention in an erect position.
Figure 5B:
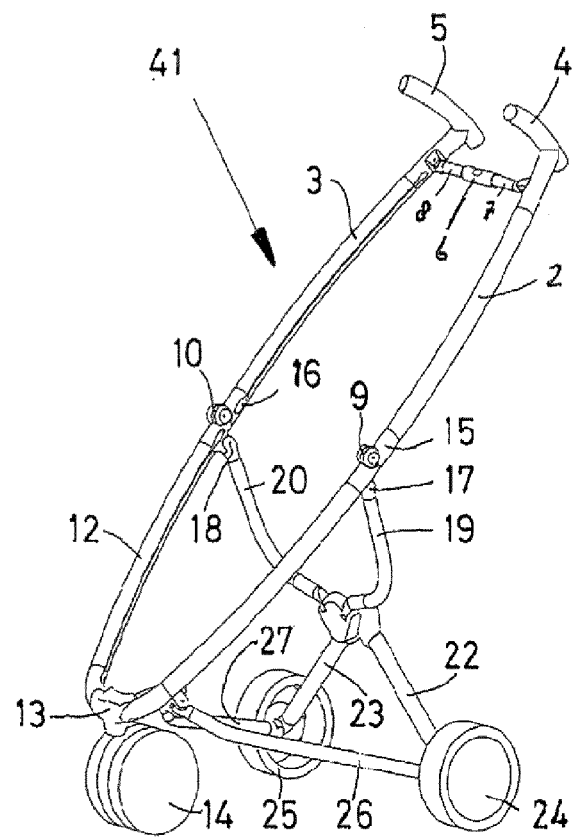

FIGS. 5A-5C are a side view, perspective view and rear view of a second embodiment of the stroller 41 according to the invention. For reasons of clarity of the drawing, the stroller 41 is not provided with a seat for an infant to be transported by means of the stroller. The stroller 41 differs from the stroller 1 in that instead of a rod 30, the stroller 41 is provided with an imaginary axis 42 which extends through the support 13 and through the central joint 43. The central joint 43 is movable towards and away from the support 13 over the imaginary axis 42 during folding and unfolding of the stroller 41.

It is also possible to move the central joint 43 away from the support 13 to collapse the stroller 41 and to move the central joint 43 towards the support to erect the stroller 41.

The strollers 1, 41 described so far are similar to the strollers as disclosed in EP1466810A1 of applicant.

Figure 7:
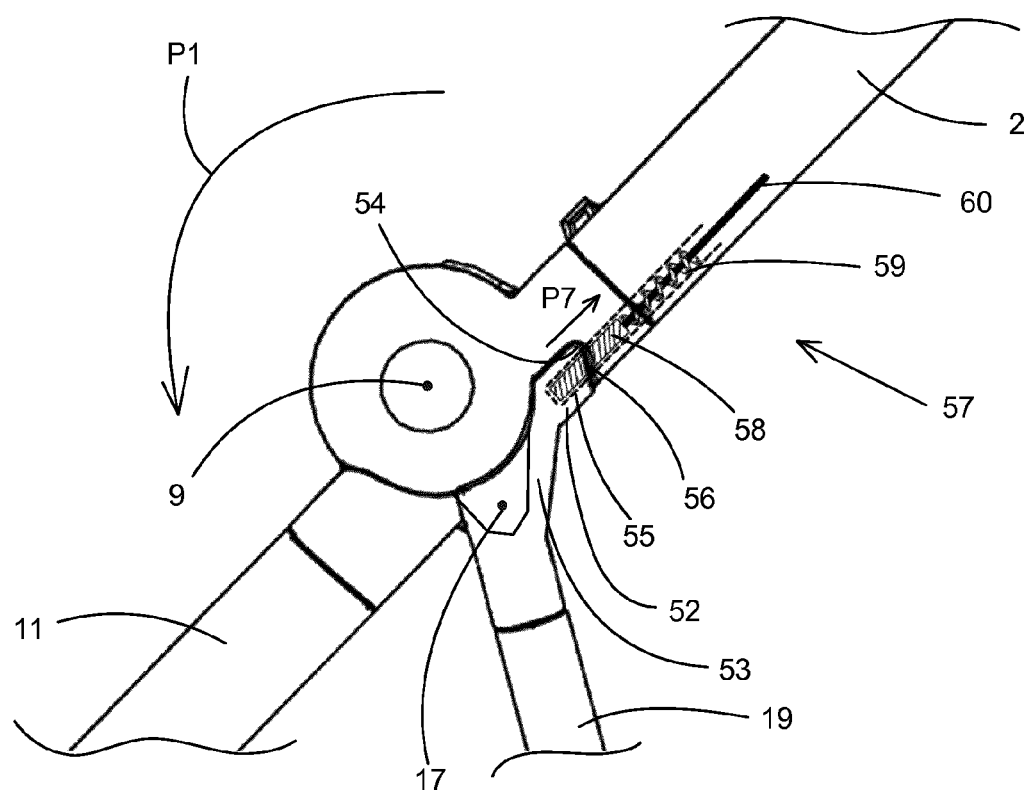
FIG. 7 shows a side view of a part of the stroller as shown in FIG. 6, with connected and locked connecting elements.
Figure 8:
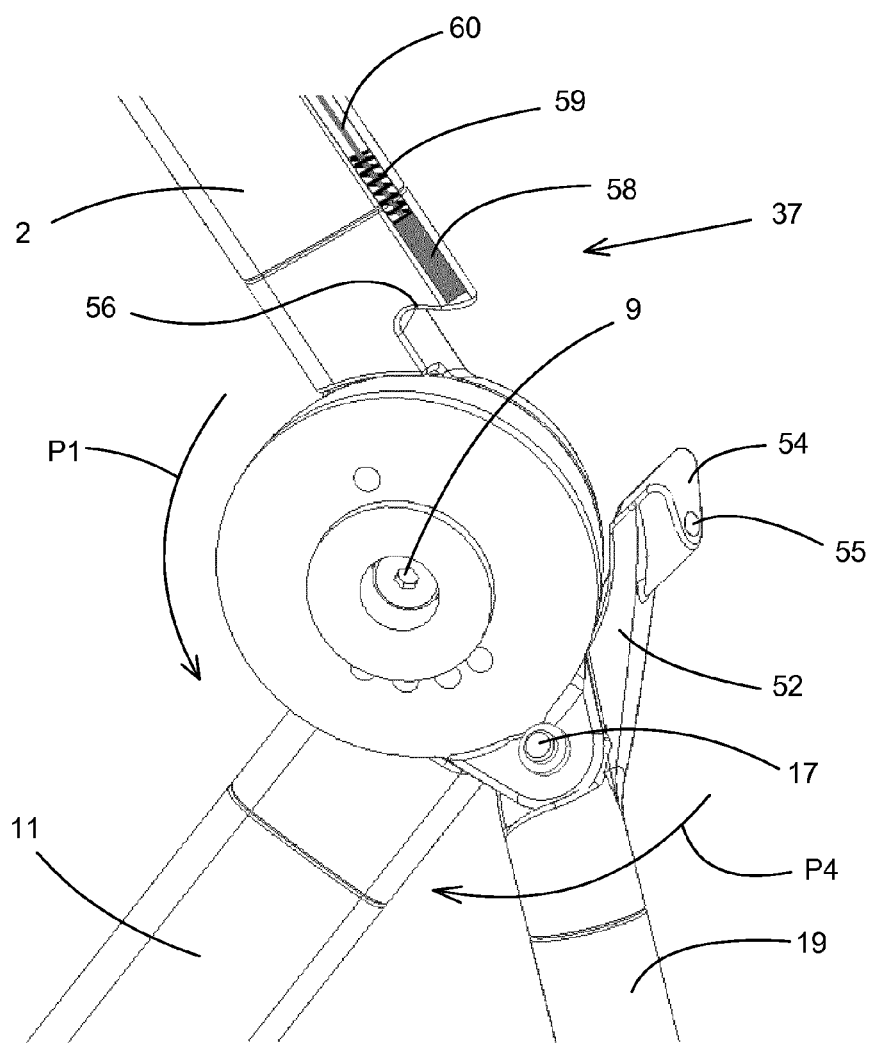
FIG. 8 shows a side view of a part of the stroller as shown in FIG. 6, with unlocked and disconnected connecting elements.

FIGS. 6, 7 and 8 show detailed views of the left side (seen in the driving direction of the stroller) of the stroller 1.

The stroller 1 as shown in the FIGS. 6-19 might differ from the stroller 1 as shown in the FIGS. 1-5 in that instead of a locking element 6, the rods 7, 8 are being pivotally interconnected by means of a pivot axis 106.

The rod 19 forms a first rod, whilst the rod ii forms a second rod. The second rod 11 extends substantially parallel to the push rod 2 in the erect position of the stroller 1 (FIGS. 6 and 7).

As can now be more clearly seen, the rod 19 of the cross shaped linkage system 51 is provided with a protrusion 52 extending from an end 53 of the rod 19 towards the handle 4 of the push rod 2. The protrusiond 52 forms a first connecting element. The protrusion 52 comprises a bevelled edged 54 provided with a passage 55. The passage 55 extends parallel to the push rod 2 in the erect position of the stroller 1.

The push rod 2 is provided with a hook 56 located between the first pivot axis 9 and the handle 4. The hook 56 forms a second connecting element. The bevelled edge 54 of the protrusion 52 is located inside the hook 56 in the erect position of the stroller 1.

As can also be seen the stroller 1 is provided with a locking means 57 comprising a pen (pin) 58 being slidably located in the push rod 2. The pen (pin) 58 is movable against spring force of a spring 59 in a direction indicated by arrow P7.

The locking means 57 also comprises a cable 60. The cable 60 is connected with a first end to the pen (pin) 58 and with a second end to a movable operating element 61 located on the handle 4 of the push rod 2. The cable 60 and operating element 61 form unlocking means.

The protrusion 52, the hook 56 and the locking means are also provided on the right side of the stroller 1 on the rod 20 and push rod 3.

In the erect position the stroller 1 is locked by means of the locking means 57 located at the connections between the rods 2,3 fitted with a handle 4, 5 and the second ends of the rods 19, 20.

FIGS. 1A-1C show the stroller 1 in the fully erect position. FIGS. 4A 4B show the stroller 1 in the fully collapsed position. The collapsing of the erected stroller 1 starts from the erect position shown in FIGS. 1A-1C by disconnecting the locking element 6 as a result of which the rods 7, 8 positioned on either side of the locking element 6 can pivot with respect to each other. The user will than move the operating element 61 so that the cable 60 will pull the pen (pin) 58 against spring force of the spring 59 from a first locked position (as shown in FIGS. 6 and 7) wherein the pen (pin) 58 is located in the passage 55 of the rod 19, to a second unlocked position wherein the pen (pin) 58 is removed from the passage 55 and is fully located inside the push rod 2. The protrusion 52 and the hook 56 are still connected to each other so the hook 56 prevents the rod 19 to pivot about the second pivot axis 17, 18. The first and second axis 9, 17 extend under an angle with each other. Since the rod 19 can not be pivoted about the second pivot axis 17, 18, the cross-shaped linkage 51 can not collapse.

By pivoting the push rods 2, 3 about the pivot axes 9, 10 in the direction as indicated by arrow P1, the hook 56 will be moved away from the protrusion 52 as can be seen in FIG. 8 allowing the rods 19, 20 to pivot about the second pivot axes 17, 18 in the direction indicated by arrow P3 so that the bushing 21 of the central joint of the cross-shaped linkage 51 can be moved over the rod 30 in the direction indicated by the arrow P2 towards the support 13 that is connected to the front wheel 14. As a result, the J-shaped rods 19, 20 pivot about the second pivot axes 17, 18 in the direction indicated by the arrow P3 and also in the direction indicated by the arrow P4 with respect to the bushing 21. At the same time, the wheel supporting rods 22, 23 pivot with respect to the bushing 21 in the direction indicated by the arrow P5. The intermediate rods 25, 26 pivot about the third pivot axes 28, 29 in the direction indicated by the arrow P6 towards the support 13. The bushing 21 is moved over the rod 30 in the direction indicated by the arrow P2 until the stroller 1 has reached the collapsed position that is shown in FIGS. 4A and 4B. The dimension L1 of the collapsed stroller 1 is practically the same as the dimension L2 of the stroller 1 in the erect position, said dimension L2 being the distance between the front side of the front wheel 14 and the rear side of the rear wheel 24. In thcpis case L2 is e.g. 58 cm, whilst L1 is 65 cm. The height H1 (e.g. 25 cm) of the collapsed stroller 1 is slightly greater than the diameter (e.g. 15 cm) of the front wheel 14, whilst the width B1 (e.g. 22 cm) of the collapsed stroller 1 is about three times the width b1 (e.g. 6 cm) of the rear wheels 24. The user will pivot the push rods 2, 3 in the direction indicated by the arrow P1, until the push rods 2, 3 will be positioned parallel to the rods 11, 12 (Subsequently shown in FIGS. 2A-2B; 3A-3B; 4A-4B).

To erect the stroller 1 from the collapsed position, the bushing 21 is being moved away from the support 13. After the bushing 21 is in its erect position, the push rods 2, 3 are being pivoted about the first pivot axes 9, 10 in a direction is opposite to the direction indicated by arrow P1, until the hook 56 is being positioned over the protrusion 52. The rod 19 and the push rod 2, 3 are now connected to each other by means of the connecting elements formed by the hook 56 and protrusion 52. Next, the connecting elements formed by the hook 56 and protrusion 52 are locked to each other by the locking means 57.

The stroller 41 is provided with the same connecting elements and locking means as the stroller 1.

Figure 9A:
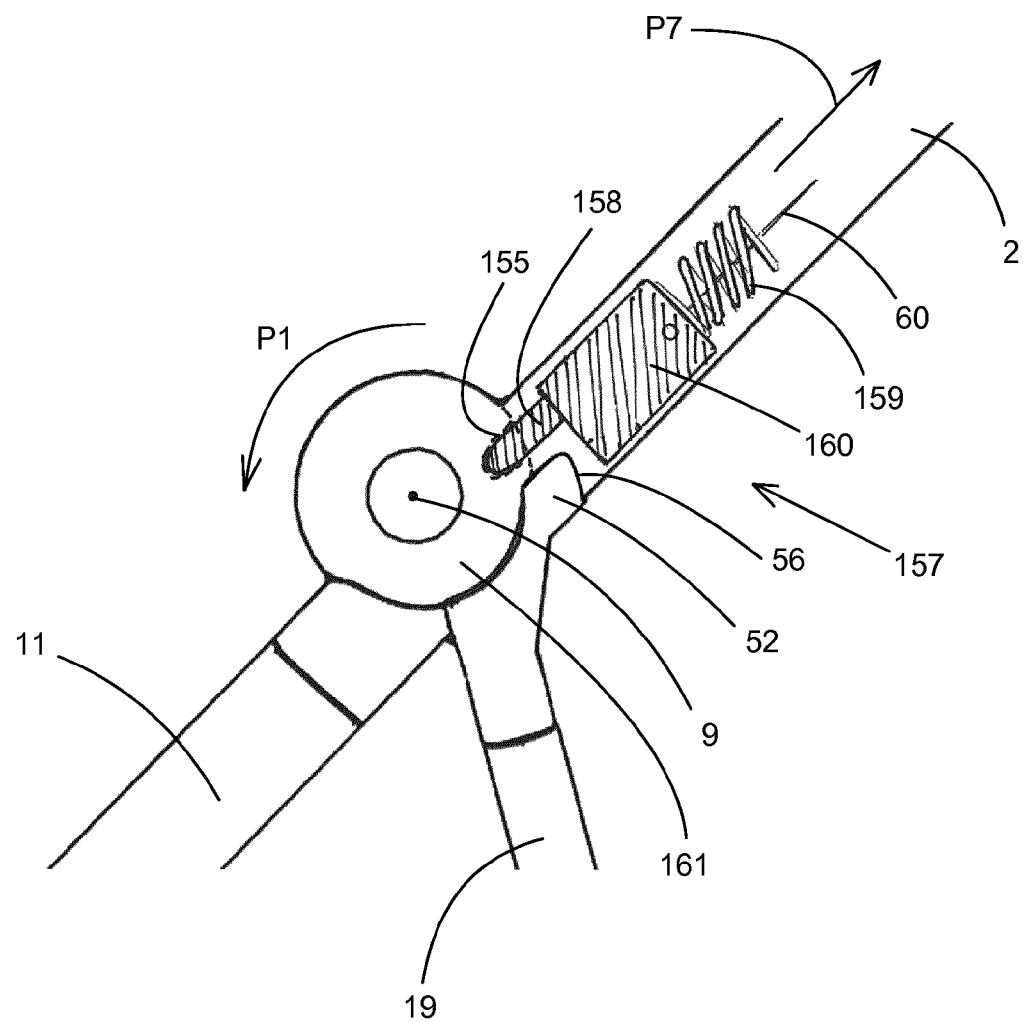
FIGS. 9A-9B show side views of another embodiment of the stroller according to the invention respectively with connected and locked connecting elements and with unlocked and disconnected connecting elements.
Figure 9B:
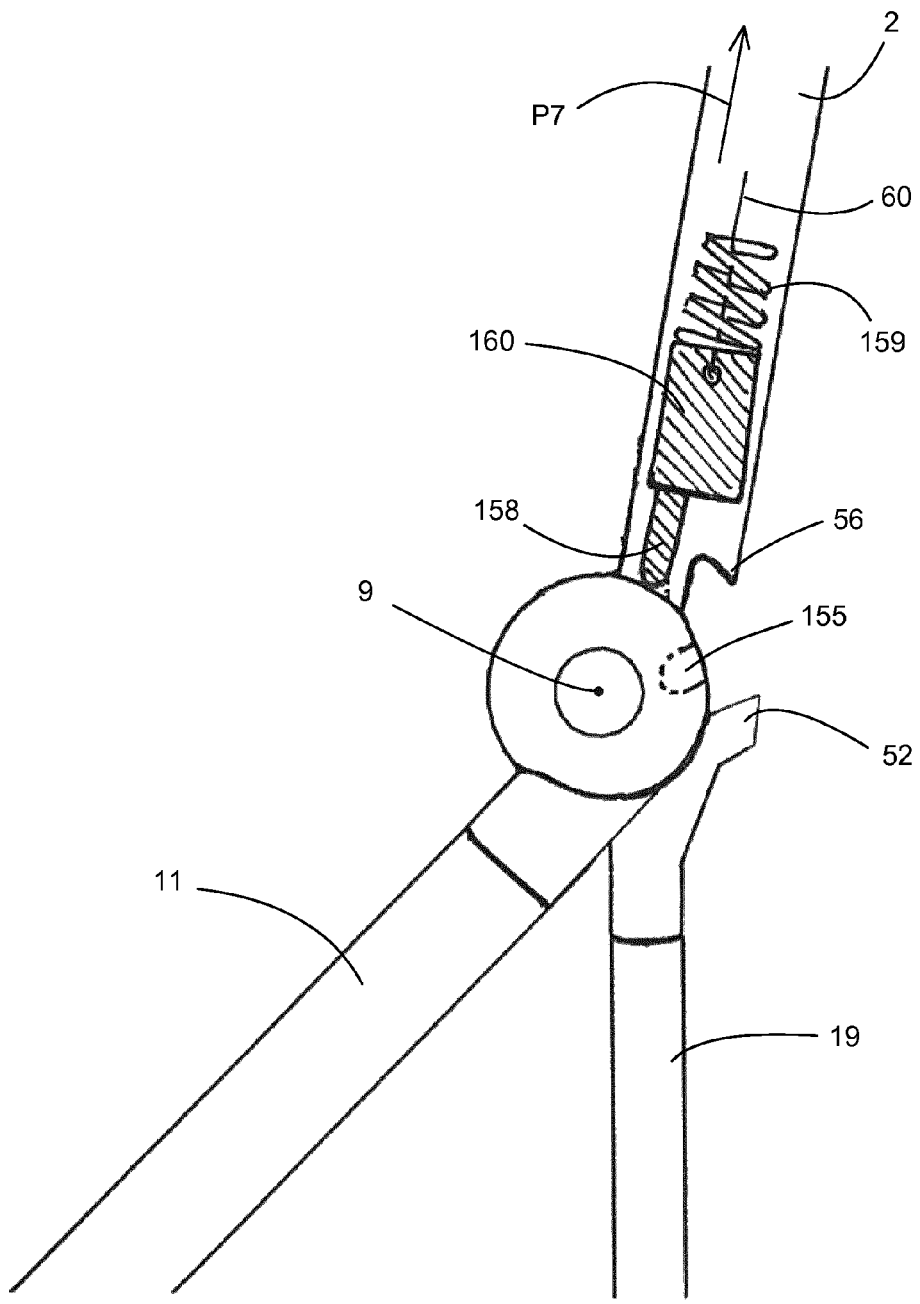

FIGS. 9A-9B show side views of another embodiment of the stroller 1 according to the invention which differs from the stroller 1 as shown in FIG. 6 that it comprises locking means 157 instead of locking means 57.

The locking means 157 comprising a slide 160 being slidably located in the push rod 2. The slide 160 is movable against spring force of a spring 156 in a direction indicated by arrow P7. The locking means 157 also comprises the cable 60 in the same manner as the locking means 57. The slide 160 is provided with a pen (pin) 158 which cooperates with a passage 155 located in a disc-shaped part 161 of the rod 11.

To operate the locking means 157, a user will move the operating element 61 so that the cable 60 will pull the slide 160 together with the pen (pin) 158 against spring force of the spring 159 from a first locked position (as shown in FIG. 9A) wherein the pen (pin) 158 is located in the passage 155 of the rod 11, to a second unlocked position (as shown in FIG. 9B) wherein the pen (pin) 158 is removed from the passage 155 and is fully located inside the push rod 2.

In the position as shown in FIG. 9B an end of the pen (pin) 158 avert of the slide 160 rests against an outer side of the disc-shaped part 161, which prevents the slide 160 as well as the pen (pin) 158 to move under spring force in the direction opposite to the direction indicated by arrow P7. When moving the stroller 1 back to the erect position, the pen (pin) 158 will be moved under spring force in the direction opposite to the direction indicated by arrow P7 into the passage 155 as soon as the pen (pin) 158 and the passage 155 are aligned.

Figure 10A:
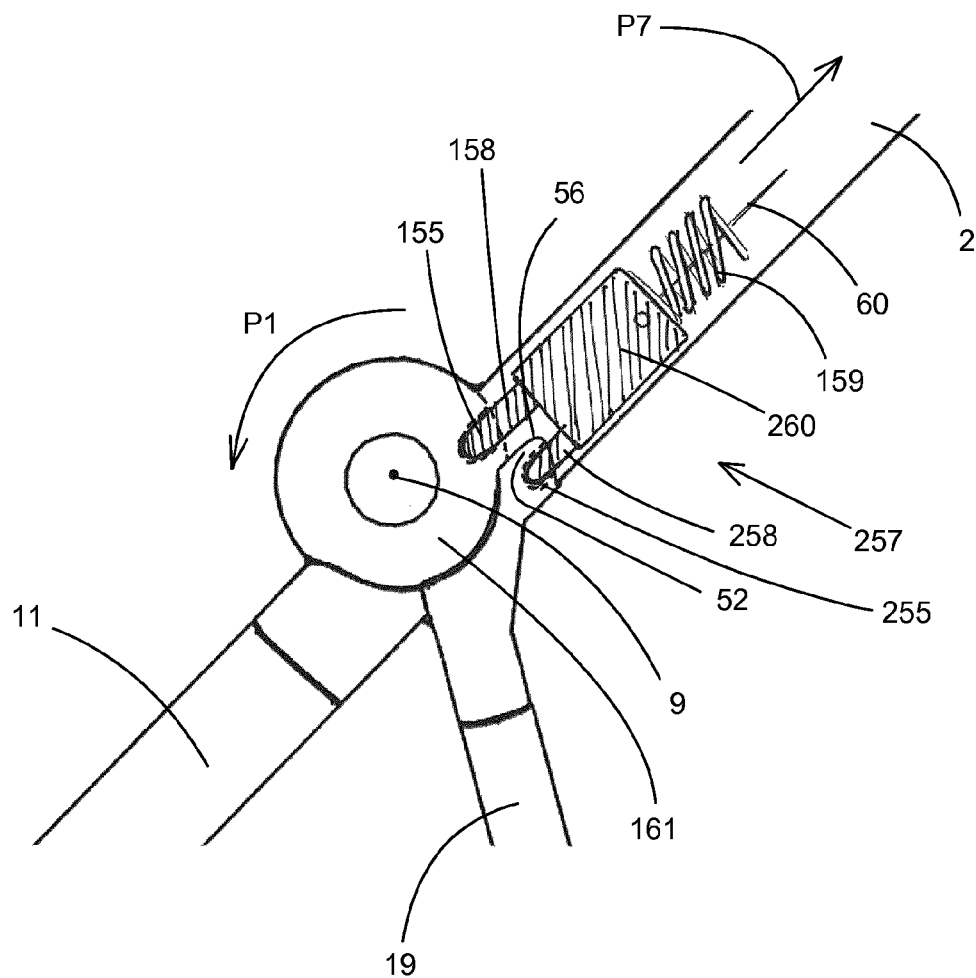
FIGS. 10A-10B show side views of a further embodiment of the stroller according to the invention respectively with connected and locked connecting elements and with unlocked and disconnected connecting elements.
Figure 10B:
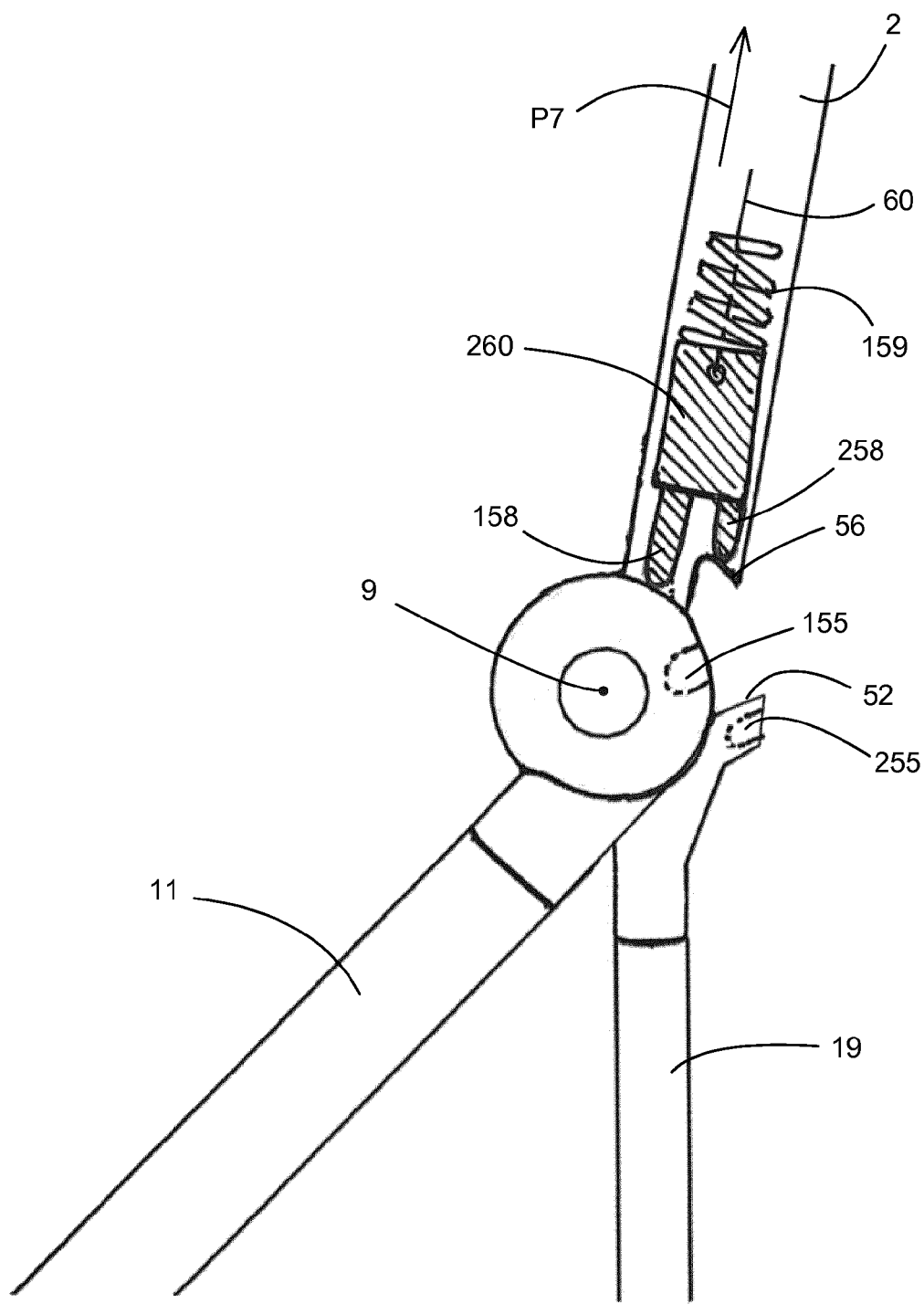

FIGS. 10A-10B show show side views of a further embodiment of the stroller 1 according to the invention which differs from the stroller 1 as shown in FIG. 6 that it comprises locking means 257 instead of locking means 57.

The locking means 257 comprising a slide 260 being slidably located in the push rod 2. The slide 260 is movable against spring force of a spring 159 in a direction indicated by arrow P7. The locking means 257 also comprises the cable 60 in the same manner as the locking means 57. The slide 260 is provided with a pen (pin) 158 which cooperates with a passage 155 located in a disc-shaped part 161 of the rod 11. The slide 260 is also provided with a pen (pin) 258 which cooperates with a passage 255 located in the J-shaped rod 19.

To operate the locking means 257, a user will move the operating element 61 so that the cable 60 will pull the slide 260 together with the pens (pins) 158, 258 against spring force of the spring 159 from a first locked position (as shown in FIG. 10A) wherein the pen (pin) 158 is located in the passage 155 of the rod 11 and the pen (pin) 258 is located in the passage 255 of the rod 19, to a second unlocked position (as shown in FIG. 10B). In the second unlocked position the pens (pins) 158, 258 are removed from the respective passages 155, 255 and are fully located inside the push rod 2.

In the position as shown in FIG. 10B an end of the pen (pin) 158 avert of the slide 160 rests against an outer side of the disc-shaped part 161, which prevents the slide 260 as well as the pens (pins) 158, 258 to move under spring force in the direction opposite to the direction indicated by arrow P7. When moving the stroller 1 back to the erect position, the pens (pins) 158, 258 will be moved under spring force in the direction opposite to the direction indicated by arrow P7 into the respective passages 155, 255 as soon as the pens (pins) 158, 258 and the passages 155, 255 are aligned.

Figure 11:
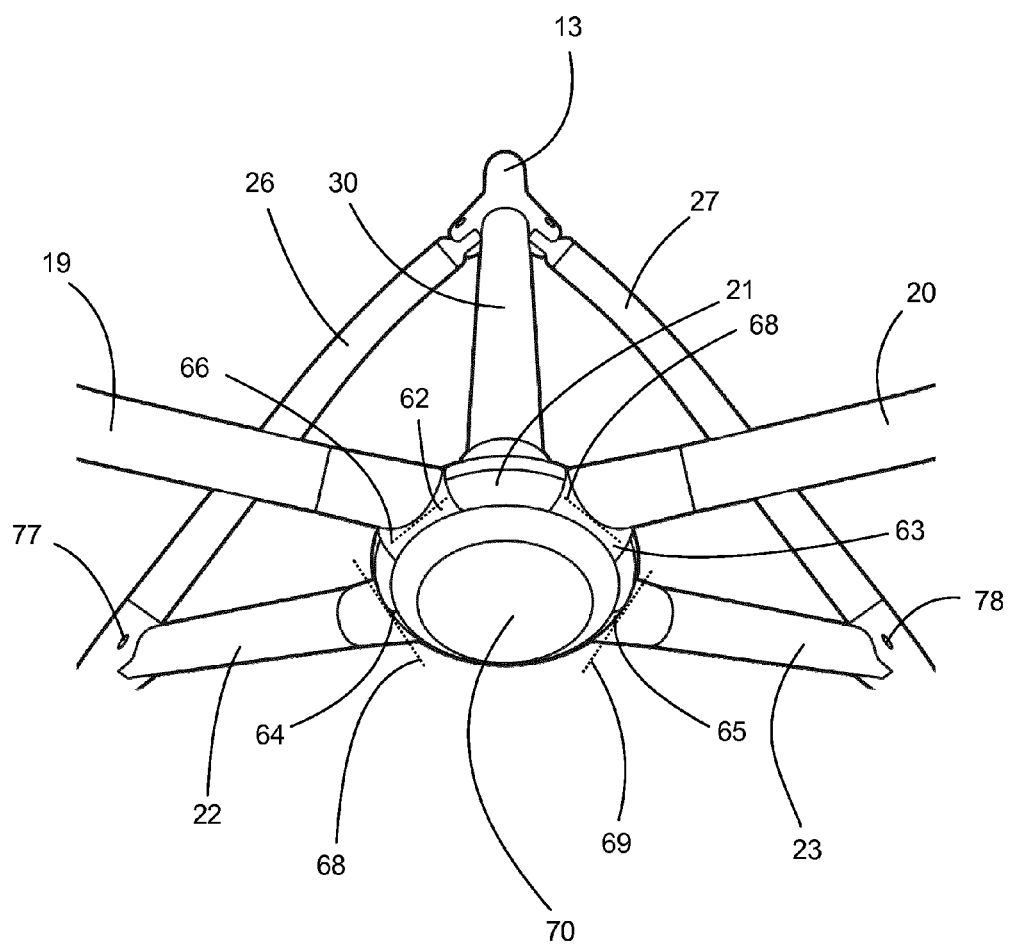
FIG. 11 shows an enlarged rear view of a part of the stroller as shown in FIG. 6.
Figure 12:
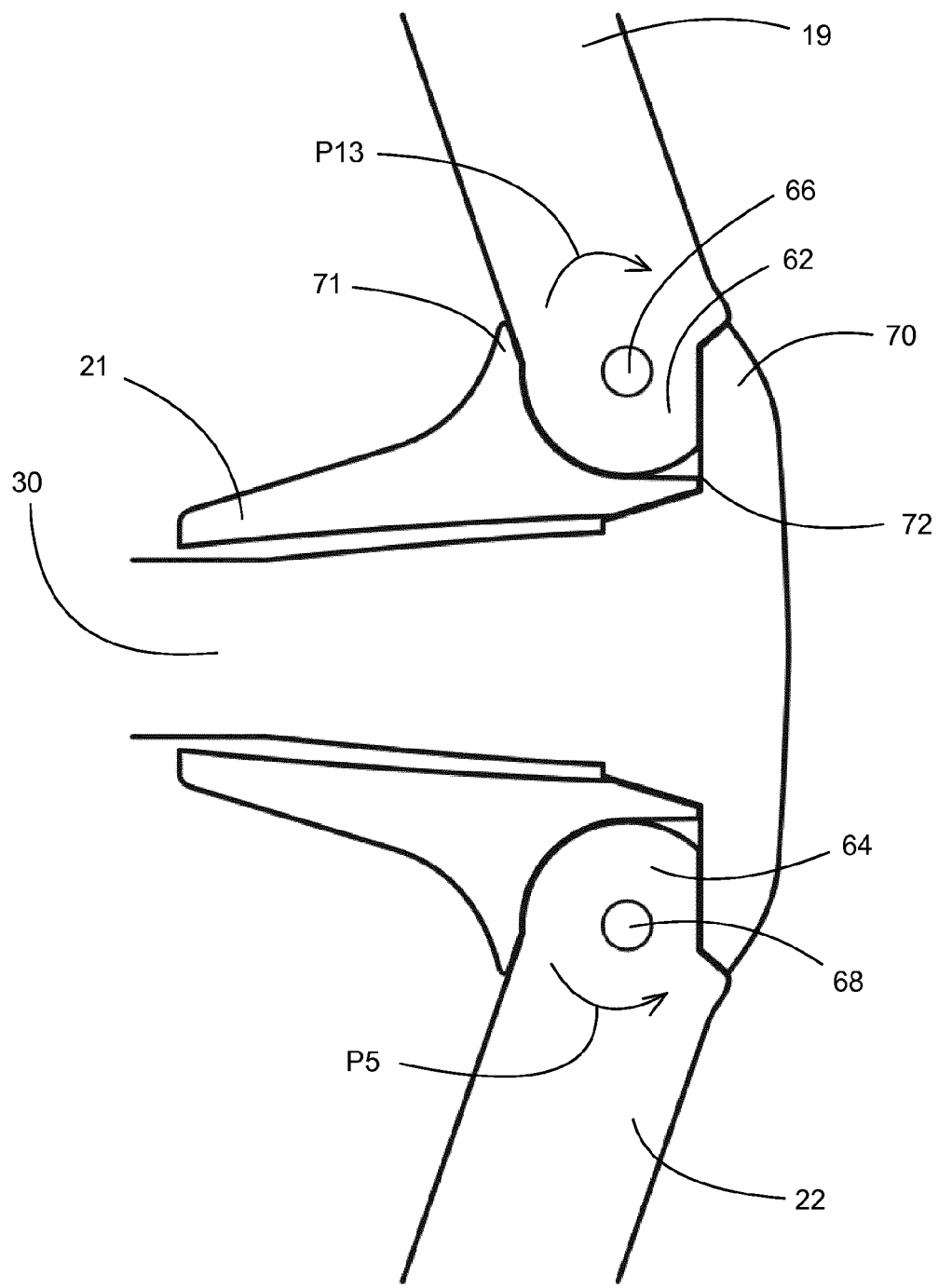
FIG. 12 shows a cross section of the enlarged rear view of the stroller as shown in FIG. 11, FIGS. 13A-13C show a detailed side view, rear view and front view of the stroller as shown in FIG. 6, showing the stroller in a partly erect position thereof.

FIG. 11 shows a detailed rear view (seen in the driving direction of the stroller) of the stroller 1, whilst FIG. 12 shows a cross section thereof.

First ends 62, 63, 64, 65 of the rods 19, 20, 22, 23 of the cross shaped linkage system 51 are pivotable connected to the bushing 21 about pivot axes 66, 67, 68, 69.

At an end remote of the support 13 a disc-shaped stop element 70 is connected to the central rod 30. The disc-shaped stop element 70 extends perpendicular to the central rod 30.

The bushing 21 is provided with a collar 71 extending perpendicular to the central rod 30.

As can best be seen in FIGS. 12 and 16 the pivot axes 62, 63, 64, 65 of the rods 19, 20, 22, 23 are located on a side of the collar 71 of the bushing 21 directed towards the disc-shaped stop element 70. In the erect position of the stroller 1 as shown in FIGS. 6, 7, 11, 12, the first ends 62-65 abut against the disc-shaped stop element 70 and against the side of the collar 71 directed towards the disc-shaped stop element 70, whereby movement of the bushing 21 in a direction opposite to the arrow P2 towards the disc-shaped stop element 70 is being stopped. Furthermore, rotation of the rods 19, 20, 22, 23 in and opposite to the direction indicated by the arrow P13 is also prevented.

As can best be seen in FIG. 12 also an end 72 of the bushing 21 is in abutment with the disc-shaped stop element 70.

FIGS. 13A-14 show different views of the stroller 1 in a partly erect position. FIG. 8 shows an enlarged view of the connection between the rods 2, 11, 19 with unlocked locking means 37 enabling the rods 2, 11, 19 to pivot with respect to each other about the pivot axes 9, 17. In the partly erect position, the first ends 62-65 of the rods 19, 20, 22, 23 of the cross shaped linkage system 31 no longer abut against the disc-shaped stop element 70, whereby the rods 19, 20, 22, 23 can pivot in a direction indicated by arrow P13 towards the disc-shaped stop element 50.

FIG. 15 shows an enlarged view of the central rod 30 and the disc-shaped stop element 70 of the stroller 1. The disc-shaped stop element 70 of the stroller 1 is provided with four notches 73.

The bushing 21 of the central joint is provided with four grooves 74. The grooves 74 provided on the bushing 21 cooperate with the notches 73 provided on the disc-shaped stop element 70. In the erect position, the notches 73 of the disc-shaped stop element 70 are located in the grooves 74 of the bushing 21. Furthermore, the first ends 62, 63, 64, 65 of the rods 19, 20, 22, 23 are located in opinings 75 between the notches 73. By having the notches 73 located in the grooves 74 as well as the first ends 62, 63, 64, 65 located in the opinings 75 rotation of the bushing 21 about the central rod 30 is being prevented.

By the disc-shaped stop element 70 movement of the bushing 21 in a direction opposite to arrow P2, pivoting of the rods 19, 20, 22, 23 in the direction of arrow P13 towards the disc-shaped stop element 70 as well as rotation of the bushing 21 about the central rod 30 is being prevented.

A virtual plane 75 (FIG. 6) can be defined extending through the pivot axes 17, 18 at the second ends 33 of the rods 19, 20 as well as through the pivot axes 77, 78 at second ends of the rods 22, 23.

In the erect position the first pivot axes 66-69 at the first ends 62-65 of the rods 19-22, are located on the same side of the virtual plane 76 as the disc-shaped stop element 70.

FIGS. 17-18 show different views of the stroller 1 in a partly collapsed position. In the partly collapsed position the first pivot axes 66-69 at the first ends 62-65 of the rods 19, 20, 21 are located on the other side of the virtual plane 76 as the disc-shaped stop element 70.

FIG. 19 shows the stroller 1 in the fully collapsed position. In the fully collapsed position the wheels 24, 25 are located near each other close to the disc-shaped stop element 70, whilst the bushing 21 is located close to the support 13.

FIG. 6 shows the stroller 1 in the fully erect position. FIGS. 13A and 13B show the stroller 1 in the partly erect position, FIG. 17 shows the stroller 1 in the partly collapsed position and FIG. 19 shows the stroller 1 in the collapsed position. The collapsing of the erected stroller 1 starts from the erect position shown in FIG. 6. The user will move the operating element 61 so that the cable 60 will pull the pen (pin) 58 against spring force of the spring 59 from a first locked position as shown in FIG. 7 wherein the pen (pin) 58 is located in the passage 55 of the rods 19, 20 to a second unlocked position wherein the pen (pin) 58 is removed from the passage 55 and is fully located inside the push rods 2, 3. The rods 7, 8 positioned on either side of the pivot axis 6 can now pivot with respect to each other. The protrusion 32 and the hook 56 are still connected to each other so the hook 56 prevents the rods 19, 20 to pivot about the second pivot axis 17, 18. The first and second axis 9, 17 extend under an angle with each other. Since the rods 19, 20 can not be pivoted about the second pivot axis 17, 18, the bushing 21 can not be moved with respect to the disc-shaped stop element 70 and the cross-shaped linkage 51 can not collapse.

By pivoting the push rods 2, 3 about the pivot axes 9, 10 in the direction as indicated by arrow P1, the hook 56 will be moved away from the protrusion 32 as can be seen in FIG. 8 allowing the rods 19, 20 to pivot about the second pivot axes 17, 18 in the direction indicated by arrow P4 so that the bushing 21 of the central joint of the cross-shaped linkage 51 can be moved over the rod 30 in the direction indicated by the arrow P2 towards the support 13 that is connected to the front wheel 14. As a result, the J-shaped rods 19, 20 pivot about the second pivot axes 17, 18 in the direction indicated by the arrow P4 and also in the direction indicated by the arrow P3 with respect to the bushing 21. At the same time, the wheel supporting rods 22, 23 pivot with respect to the bushing 21 in the direction indicated by the arrow P5. The intermediate rods 25, 26 pivot about the third pivot axes 28, 29 towards the central rod 30. The bushing 21 is moved over the rod 30 in the direction indicated by the arrow P2, whereby the stroller 1 will be folded from the erect position as shown in FIG. 6, via the partly erect position as shown in FIGS. 13A and 13B to the partly collapsed position as shown in FIG. 17 until the stroller 1 has reached the fully collapsed position that is shown in FIG. 12.

The user will pivot the push rods 2, 3 in the direction indicated by the arrow P1, until the push rods 2, 3 will be positioned parallel to the rods 11, 12.

To erect the stroller 1 from the collapsed position, the bushing 21 is being moved away from the support 13 until the end 52 of the bushing 21 abuts against the disc-shaped stop element 70. The first ends of the rods 19, 20, 22, 23 abut against the disc-shaped stop element 70 as well. As the bushing 21 is in its erect position, the push rods 2, 3 are being pivoted about the first pivot axes 9, 10 in a direction opposite to the direction indicated by arrow P1, until the hook 56 is being positioned over the protrusion 52. The rod 19, 20 and the push rod 2, 3 are now connected to each other by means the hook 56 and protrusion 52. Next, the hook 56 and protrusion 52 are locked to each other by the locking means 57.

Due to the locking means 57, the J-shaped rods 19, 20 can not pivot about the second pivot axes 17, 18 in the direction indicated by the arrow P4 and can also not pivot in the direction indicated by the arrow P13 with respect to the bushing 21, thus preventing the bushing 21 to slide over the central rod 30 in the direction of arrow P2. Furthermore, pivoting of the J-shaped rods 19, 20 as well as the wheel supporting rods 22, 23 in the direction indicated by the arrow P4 is being prevented by the disc-shaped stop element 70.

It is also possible to use a locking element at the pivot axis 6 between the rods 7, 8.

It is also possible that, for example, the rods 19, 20 are rigidly connected to each other, whereby the rods 19, 20 are simultaneously pivotable with respect to the bushing 21 and that also the rods 22, 23 are rigidly connected to each other, whereby the rods 22, 23 are simultaneously pivotable with respect to the bushing 21. In such a case, the rods 7, 8 can be fixed to each other and form one single rod.

It is also possible to use additional locking means near the pivot axes 9, 10 or to position the operating element 61 near the pivot axes 9, 10.

It is also possible to refrain from the handles 4, 5 and to use the interconnected rods 7, 8 as handle bars.

It is possible that the disc-shaped stop element 50 has another shape than a round shape, for example has a square, rectangular, triangle or other kind of shape.

It is also possible to let the pens (pins) and passages of the locking means extend in a direction perpendicular to the direction indicated by arrow P7, wherein additional means are provided to transfer the movement of the cable 60 in the direction indicated by arrow P7 into a movement in a direction perpendicular to the direction indicated by arrow P7.

Instead of rods 7, 8 and locking element 6 it is also possible to detachably connect the push rods 2, 3 near the handles 4, 5 by other means.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appinded claims.

In the claims, the word "comprising" does not exclude other elements or steps, and the indefinite article "a" or "an" does not exclude a plurality. The mere fact that certain measures are recited in mutually different depindent claims does not indicate that a combination of these measures cannot be used to advantage. Any reference signs in the scope should not be construed as limiting the scope of the claims.

LIST OF REFERENCES 1 stroller
2 push rod
3 push rod
4 handle
5 handle
6 locking element
7 interconnected rod
8 interconnected rod
9 first pivot axis
10 first pivot axis
11 rod
12 rod
13 support
14 front wheel
15 end part
16 end part
17 second pivot axis
18 second pivot axis
19 J-shaped rod
20 J-shaped rod
21 bushing
22 wheel supporting rod
23 wheel supporting rod
24 rear wheel
25 rear wheel
26 intermediate rod
27 intermediate rod
28 third pivot axes
29 third pivot axes
30 rod
41 stroller
42 imaginary axis
43 central joint
51 cross shaped linkage system
52 protrusion
53 end
54 bevelled edge
55 passage
56 hook
57 locking means
58 pen (pin)
59 spring
60 cable
61 operating element
62 first end
63 first end
64 first end
65 first end
66 pivot axis
67 pivot axis
68 pivot axis
69 pivot axis
70 disc-shaped stop element
71 collar
72 end
73 notch
74 groove
75 opining
76 virtual plane
77 pivot axis
78 pivot axis
106 pivot axis
155 passage
157 clocking means
158 pen (pin)
159 spring
160 slide
161 disc-shaped part
255 passage
257 locking means
258 pen (pin)
260 slide
P1 arrow
P2 arrow
P3 arrow
P4 arrow
P5 arrow
P6 arrow
P7 arrow
P13 arrow
L1 dimension
L2 dimension
H1 height
B1 width

The invention claimed is:

1. A stroller being foldable from an erect position to a collapsed position, and vice versa, which stroller comprising at least a collapsible folding mechanism, provided with at least one push rod fitted with a handle, which push rod is pivotable about a first pivot axis of the folding mechanism, which folding mechanism is further provided with a number of rods, wherein a first rod of said number of rods is pivotable about a second pivot axis of the folding mechanism, characterized in that the first rod and the push rod are provided with cooperating connecting elements, which connecting elements being connectable to each other by pivoting the push rod about the first pivot axis to an erect position of the push rod, wherein in the erect position of the push rod, the connecting elements are lockable to each other by locking means, wherein when the locking means are unlocked and the connecting elements are still connected to each other, the connecting means prevent the first rod to pivot about the second pivot axis, whilst after unlocking the locking means as well as after disconnecting the connecting elements by pivoting the push rod about the first pivot axis towards a collapsed position of the push rod, the first rod is pivotable about the second pivot axis to allow the folding mechanism to collapse into the collapsed position of the stroller, characterized in that stroller comprises a support, at least one front wheel connected to the support and at least one rear wheel, which wheels are interconnected by means of the folding mechanism, wherein the folding mechanism comprises a cross shaped linkage system having at least one central joint as well as the first rod and additional rods extending from said central joint, wherein first ends of the first and the additional rods are pivotally connected to the central joint, whilst a second end of one of the additional rods remote from the central joint is connected to said rear wheel and a second end of the first rod remote from the central joint is pivotable about the second pivot axis of the folding mechanism, which central joint being movable with respect to the support over an axis extending between the central joint and the support during erection and collapsion of the stroller, characterized in that the folding mechanism furthermore comprises a central rod connected to the support, which central joint is slidably connected to the rod near an end remote from the support, wherein said axis extends through said rod, characterized in that at an end remote of the support a disc-shaped stop element extending perpendicular to the central rod is connected to the central rod, wherein the pivot axes of the rods are located on a side of the central joint directed towards the disc-shaped stop element, whereby in the erect position, at least the first ends of the rods abut against the disc-shaped stop element.

2. A stroller according to claim 1, characterized in that the first and second pivot axes are provided near an end of a second rod extending substantially parallel to the push rod in the erect position of the stroller.

3. A stroller according to claim 2, characterized in that on both sides of the stroller, such a push rod fitted with said handle, such a first rod as well as such a second rod, extending substantially parallel to the push rod in the erect position of the stroller are located.

4. A stroller according to claim 3, characterized in that a first of said connecting elements comprises a protrusion, whilst a second of said connecting elements comprises a hook, which is positioned over the protrusion, when the connecting elements are connected to each other.

5. A stroller according to claim 1, characterized in that second ends of two rods forming part of the cross-shaped linkage system are each pivotably connected to the push rod fitted with the handle as well as to a rod connected to said at least one front wheel.

6. A stroller according to claim 1, characterized in that the central joint comprises a bushing, which bushing is slidably over the central rod connected to the support.

7. A stroller according to claim 1, characterized in that said axis is an imaginary axis which extends through the support and through the central joint.

8. A stroller according to claim 1, characterized in that with respect to a virtual plane extending through pivot axes at the second ends of the rods, the pivot axes of the first ends of the rods are located on one side of said virtual plane in the collapsed position and on the other side of said virtual plane in the erect position.

9. A stroller according to claim 1, characterized in that the stroller comprises two of said at least one rear wheels and two of said at least one push rods fitted with a handle, wherein the cross shaped linkage system comprises at least four rods, wherein second ends of the four rods are located near said rear wheel and near said push rod fitted with the handle respectively.

10. A stroller according to claim 1, characterized in that in the erect position at least the first ends of the rods abut against the central joint.

11. A stroller according to claim 1, characterized in that in the erect position the central joint abuts against the disc-shaped stop element.

12. A stroller according to claim 1, characterized in that the central joint and the disc-shaped stop element are provided with at least one cooperating set comprising a groove and a notch, the groove being provided on the central joint, whilst the notch being provided on the disc-shaped stop element or vice versa, whereby in the erect position, the notch is located in the groove to prevent rotation of the central joint about the central rod.

13. A stroller being foldable from an erect position to a collapsed position, and vice versa, which stroller comprising at least a collapsible folding mechanism, provided with at least one push rod fitted with a handle, which push rod is pivotable about a first pivot axis of the folding mechanism, which folding mechanism is further provided with a number of rods, wherein a first rod of said number of rods is pivotable about a second pivot axis of the folding mechanism, characterized in that the first rod and the push rod are provided with cooperating connecting elements, which connecting elements being connectable to each other by pivoting the push rod about the first pivot axis to an erect position of the push rod, wherein in the erect position of the push rod, the connecting elements are lockable to each other by locking means, wherein when the locking means are unlocked and the connecting elements are still connected to each other, the connecting means prevent the first rod to pivot about the second pivot axis, whilst after unlocking the locking means as well as after disconnecting the connecting elements by pivoting the push rod about the first pivot axis towards a collapsed position of the push rod, the first rod is pivotable about the second pivot axis to allow the folding mechanism to collapse into the collapsed position of the stroller, characterized in that the locking means comprises a pin being slidably located in the push rod, which pin is movable against spring force from a first locked position wherein the pin is located in a passage of the first rod, to a second unlocked position wherein the pin is removed from the passage to allow the push rod to pivot about the first pivot axis.

14. A stroller according to claim 13, characterized in that the locking means comprises unlocking means, which unlocking means comprises a cable connected with a first end to the pin and with a second end to a movable operating element located on the push rod, preferably on the handle of the push rod.

15. A stroller being foldable from an erect position to a collapsed position, and vice versa, which stroller comprising at least one front wheel and at least one rear wheel, which wheels are interconnected by means of a collapsible folding mechanism, which stroller furthermore comprises at least one push rod fitted with a handle, which is connected to the folding mechanism, the folding mechanism comprises at least a cross shaped linkage system having a central joint and a central rod connected via a support to said at least one front wheel, which cross shaped linkage system also comprises a number of rods each extending from said central joint and with a first end pivotally connected about a pivot axis to the central joint, wherein second ends of rods remote from said central joint are located near said rear wheel and near said push rod fitted with the handle, respectively, which central joint being slidable over the central rod away from and to the support during the erection and collapsion of the stroller, characterized in that at an end remote of the support a disc-shaped stop element extending perpendicular to the central rod is connected to the central rod, wherein the pivot axes of the rods are located on a side of the central joint directed towards the disc-shaped stop element, whereby in the erect position, at least the first ends of the rods abut against the disc-shaped stop element, characterized in that the central joint and the disc-shaped stop element are provided with at least one cooperating set comprising a groove and a notch, the groove being provided on the central joint, whilst the notch being provided on the disc-shaped stop element or vice versa, whereby in the erect position, the notch is located in the groove to prevent rotation of the central joint about the central rod.

16. A stroller-according to claim 15, characterized in that with respect to a virtual plane extending through pivot axes at the second ends of the rods, the pivot axes of the first ends of the rods are located on one side of said virtual plane in the collapsed position and on the other side of said virtual plane in the erect position.

17. A stroller according to claim 15, characterized in that in the erect position the stroller is locked by locking means located at a connection between the push rod fitted with a handle and the folding mechanism.

18. A stroller according to claim 15, characterized in that the central joint comprises a bushing in which the central rod is slidably accommodated.

19. A stroller according to claim 15, characterized in that in the erect position at least the first ends of the rods abut against the central joint.

20. A stroller according to claim 15, characterized in that in the erect position the central joint abuts against the disc-shaped stop element.

21. A stroller according to claim 15, characterized in that the stroller comprises two of said at least one rear wheels and two of said at least one push rods fitted with a handle, wherein the cross shaped linkage system comprises at least four rods, wherein second ends of the four rods are located near said rear wheel and near said push rod fitted with the handle respectively.

22. A stroller according to claim 15, characterized in that second ends of two rods forming part of the cross-shaped linkage system are each pivotably connected to the push rod fitted with the handle as well as to a rod connected to said at least one front wheel.

* * * * *